US009207435B2

United States Patent
Tsai et al.

(10) Patent No.: US 9,207,435 B2
(45) Date of Patent: Dec. 8, 2015

(54) IMAGING OPTICAL LENS SYSTEM, IMAGING DEVICE AND MOBILE TERMINAL

(71) Applicant: LARGAN PRECISION CO., LTD., Taichung (TW)

(72) Inventors: Tsung-Han Tsai, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/163,688

(22) Filed: Jan. 24, 2014

(65) Prior Publication Data

US 2015/0168695 A1 Jun. 18, 2015

(30) Foreign Application Priority Data

Dec. 18, 2013 (TW) .............................. 102146841 A

(51) Int. Cl.
G02B 9/60 (2006.01)
G02B 13/18 (2006.01)
H04N 5/225 (2006.01)

(52) U.S. Cl.
CPC *G02B 13/18* (2013.01); *G02B 9/60* (2013.01); *H04N 5/2254* (2013.01)

(58) Field of Classification Search
CPC ......... H04N 5/2254; G02B 9/60; G02B 13/18
See application file for complete search history.

(56) References Cited

U.S. PATENT DOCUMENTS

| 8,804,254 | B2 * | 8/2014 | Sekine et al. | 359/764 |
| 8,953,256 | B2 * | 2/2015 | Noda | 359/714 |
| 2013/0258499 | A1 | 10/2013 | Hashimoto | |
| 2013/0265651 | A1 | 10/2013 | Ishizaka | |
| 2014/0049839 | A1 | 2/2014 | Shinohara | |
| 2014/0293447 | A1 * | 10/2014 | Noda et al. | 359/714 |
| 2014/0293449 | A1 * | 10/2014 | Noda et al. | 359/714 |
| 2014/0313597 | A1 | 10/2014 | Shinohara | |
| 2015/0077863 | A1 | 3/2015 | Shinohara et al. | |

FOREIGN PATENT DOCUMENTS

| WO | 2013014850 A1 | 1/2013 |
| WO | 2013175782 A1 | 11/2013 |
| WO | 2014050476 A1 | 4/2014 |
| WO | 2014155459 A1 | 10/2014 |

* cited by examiner

Primary Examiner — Nicholas Giles
(74) Attorney, Agent, or Firm — Locke Lord LLP; Tim Tingkang Xia, Esq.

(57) ABSTRACT

An imaging optical lens system includes, in order from an object side to an image side, a first lens element, a second lens element, a third lens element, a fourth lens element and a fifth lens element. The first lens element with positive refractive power has an object-side surface being convex in a paraxial region thereof. The second lens element has refractive power. The third lens element with positive refractive power has an object-side surface being convex in a paraxial region thereof and an image-side surface being concave in a paraxial region thereof. The fourth lens element with refractive power has an image-side surface being concave in a paraxial region thereof. The fifth lens element with refractive power has an image-side surface being concave in a paraxial region thereof. The imaging optical lens system has a total of five lens elements with refractive power.

34 Claims, 26 Drawing Sheets

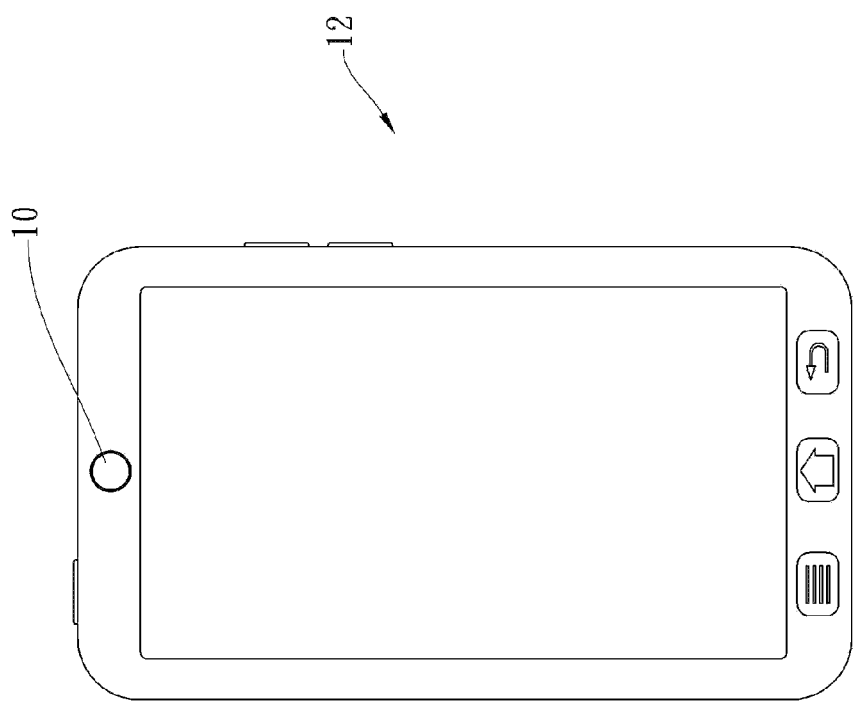

IMAGING OPTICAL LENS SYSTEM, IMAGING DEVICE AND MOBILE TERMINAL

RELATED APPLICATIONS

This application claims priority to Taiwan Application Serial Number 102146841, filed Dec. 18, 2013, which is incorporated by reference herein in its entirety.

BACKGROUND

1. Technical Field

The present disclosure relates to an imaging optical lens system, imaging device and mobile terminal. More particularly, the present disclosure relates to a compact imaging optical lens system and imaging device applicable to a mobile terminal.

2. Description of Related Art

In recent years, with the popularity of mobile terminals having camera functionalities, the demand of miniaturized optical systems has been increasing. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. The conventional optical systems cannot satisfy these requirements of the compact optical systems.

Although other conventional optical systems with five-element lens structure enhance image quality, these are not favorable for correcting Petzval Sum. Moreover, it tends to produce excessive aberration in a peripheral region of an image which might cause vagueness and distortion in the peripheral region of the image.

In light of the foregoing, a need exists in the art for having an optical system favorable for effectively correcting the Petzval Sum. In addition, it might be favorable for reducing the aberration in the peripheral region of the system through adjusting the curvatureness of the image-side surface of the fourth lens element in order to avoid vagueness and distortion in the peripheral region

SUMMARY

According to one aspect of the present disclosure, an imaging optical lens system includes, in order from an object side to an image side, a first lens element, a second lens element, a third lens element, a fourth lens element and a fifth lens element. The first lens element with positive refractive power has an object-side surface being convex in a paraxial region thereof. The second lens element has refractive power. The third lens element with positive refractive power has an object-side surface being convex in a paraxial region thereof and an image-side surface being concave in a paraxial region thereof. The fourth lens element with refractive power has an image-side surface being concave in a paraxial region thereof. The fifth lens element with refractive power has an image-side surface being concave in a paraxial region thereof, wherein both of an object-side surface and the image-side surface of the fifth lens element are aspheric, and at least one of the object-side surface and the image-side surface of the fifth lens element has at least one inflection point. The imaging optical lens system has a total of five lens elements with refractive power. When a focal length of the imaging optical lens system is f, a curvature radius of the image-side surface of the fourth lens element is R8, a central thickness of the fifth lens element is CT5, and a central thickness of the fourth lens element is CT4, the following conditions are satisfied:

$0 < f/R8 < 2.0$; and $1.3 < CT5/CT4 < 3.5$.

According to another aspect of the present disclosure, an imaging device includes the imaging optical lens system according to the foregoing aspect and an image sensor.

According to still another aspect of the present disclosure, a mobile terminal includes the imaging device according to the foregoing aspect.

According to yet another aspect of the present disclosure, an imaging optical lens system includes, in order from an object side to an image side, a first lens element, a second lens element, a third lens element, a fourth lens element and a fifth lens element. The first lens element with positive refractive power has an object-side surface being convex in a paraxial region thereof. The second lens element has refractive power. The third lens element with positive refractive power has an object-side surface being convex in a paraxial region thereof and an image-side surface being concave in a paraxial region thereof. The fourth lens element with refractive power has an image-side surface being concave in a paraxial region thereof, wherein both of an object-side surface and the image-side surface of the fourth lens element are aspheric and at least one of the object-side surface and the image-side surface of the fourth lens element has at least one inflection point. The fifth lens element with refractive power has an object-side surface being convex in a paraxial region thereof and an image-side surface being concave in a paraxial region thereof, wherein both of the object-side surface and the image-side surface of the fifth lens element are aspheric, and at least one of the object-side surface and the image-side surface of the fifth lens element has at least one inflection point. The imaging optical lens system has a total of five lens elements with refractive power. When a focal length of the imaging optical lens system is f, a curvature radius of the image-side surface of the fourth lens element is R8, a focal length of the second lens element is f2, a focal length of the fourth lens element is f4, and a focal length of the fifth lens element is f5, the following conditions are satisfied:

$0 < f/R8 < 1.2$;

$|f/f2| < 0.8$; and $-3 < f4/f5 < 1$.

According to still yet another aspect of the present disclosure, an imaging device includes the imaging optical lens system according to the foregoing aspect and an image sensor.

According to a further aspect of the present disclosure, a mobile terminal includes the imaging device according to the foregoing aspect.

BRIEF DESCRIPTION OF THE DRAWINGS

The disclosure can be more fully understood by reading the following detailed description of the embodiment, with reference made to the accompanying drawings as follows:

FIG. 13A shows a smart phone with an imaging device of the present disclosure installed therein;

DETAILED DESCRIPTION

Figure 1A:
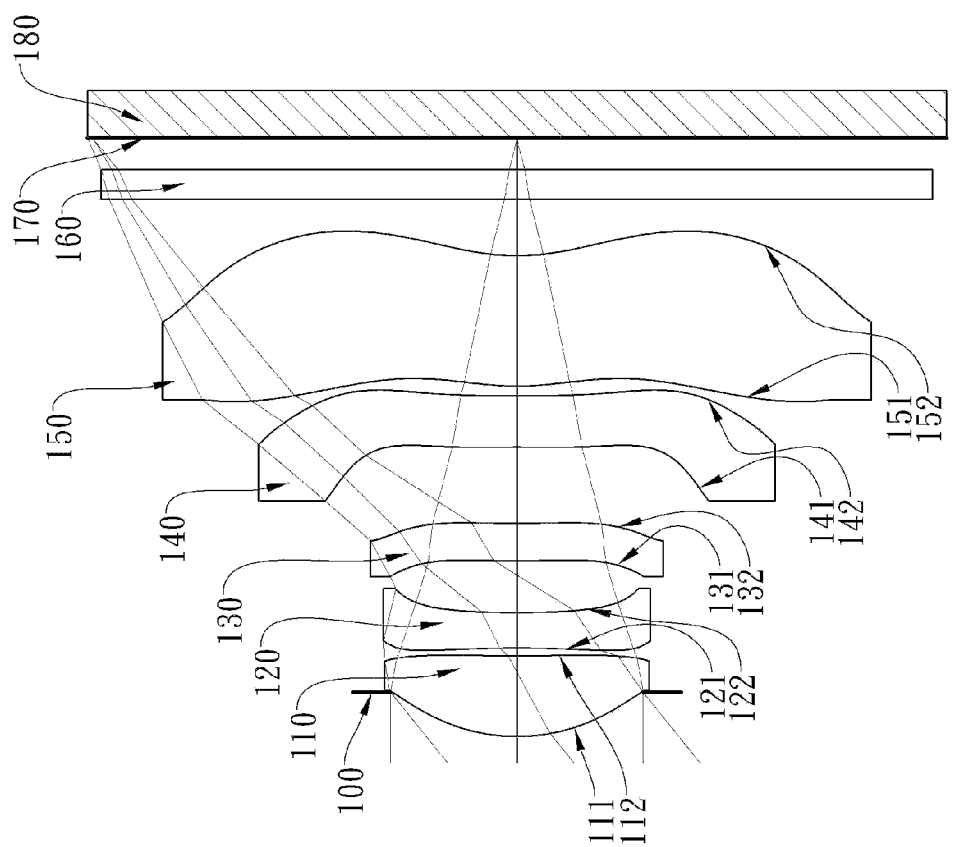
FIG. 1A is a schematic view of an imaging device according to the 1st embodiment of the present disclosure.

An imaging optical lens system includes, in order from an object side to an image side, a first lens element, a second lens element, a third lens element, a fourth lens element and a fifth lens element. The imaging optical lens system has a total of five lens elements with refractive power.

The first lens element has positive refractive power, so that it provides the imaging optical lens system with the positive refractive power as it needs to be. The first lens element has an object-side surface being convex in a paraxial region thereof and an image-side surface being concave in a paraxial region thereof. Therefore, it is favorable for reducing the astigmatism.

The second lens element can have negative refractive power, so that it is favorable for correcting the aberration of the first lens element.

The third lens element has positive refractive power, so that it is favorable for reducing the system sensitivity. The third lens element has an object-side surface being convex in a paraxial region thereof and an image-side surface being concave in a paraxial region thereof. Therefore, it is favorable for effectively correcting the astigmatism.

The fourth lens element can have an object-side surface being concave in a paraxial region thereof and an image-side surface being concave in a paraxial region thereof, wherein at least one of the object-side surface and the image-side surface of the fourth lens element can have at least one inflection point. Therefore, it is favorable for further correcting the aberration and reducing the incident angle of the light projecting onto an image sensor so as to increase the responding efficiency of the image sensor.

The fifth lens element can have an object-side surface being convex in a paraxial region thereof and an image-side surface being concave in a paraxial region thereof. Therefore, it is favorable for further correcting the astigmatism. The object-side surface of the fifth lens element can be convex in a paraxial region thereof and change to a concave shape and then a convex shape from the paraxial region to a peripheral region. Moreover, at least one of the object-side surface and the image-side surface of the fifth lens element has at least one inflection point. Therefore, it is favorable for correcting aberration of the off-axis.

When a focal length of the imaging optical lens system is f, and a curvature radius of the image-side surface of the fourth lens element is R8, the following condition is satisfied: $0<f/R8<2.0$. Therefore, it is favorable for correcting the aberration of the imaging optical lens system in a peripheral region by adjusting the curvatureness of the image-side surface of the fourth lens element. Preferably, the following condition is satisfied: $0<f/R8<1.2$.

When a central thickness of the fifth lens element is CT5, and a central thickness of the fourth lens element is CT4, the following condition is satisfied: $1.3<CT5/CT4<3.5$. Therefore, it is favorable for arranging the thicknesses of the imaging optical lens system so as to avoid the lens elements from being deformed. Preferably, the following condition is satisfied: $1.5<CT5/CT4<3.0$.

When the focal length of the imaging optical lens system is f, and a focal length of the second lens element is f2, the following condition is satisfied: $|f/f2|<0.8$. Therefore, it is favorable for correcting the aberration of the first lens element.

When a focal length of the fourth lens element is f4, and a focal length of the fifth lens element is f5, the following condition is satisfied: $-3<f4/f5<1$. Therefore, it is favorable for balancing the refractive powers of the lens elements so as to reduce the sensitivity of the imaging optical lens system.

When an axial distance between the object-side surface of the first lens element and the image-side surface of the fifth lens element is TD, and a vertical distance between a maximum effective radius position on the image-side surface of the fifth lens element and an optical axis is SD52, the following condition is satisfied: 0.50<TD/(2*SD52)<0.80. Therefore, it is favorable for reducing the space required for assembling the lens elements so as to keep the imaging optical lens system more compact.

When an axial distance between the object-side surface of the first lens element and the image plane is TL, and a maximum image height of the imaging optical lens system (half of a diagonal length of an effective photosensitive area of an image sensor) is ImgH, the following condition is satisfied: TL/ImgH<1.7. Therefore, it is favorable for keeping the imaging optical lens system compact so as to be applied to compact and portable electronic products.

When a curvature radius of the image-side surface of the fifth lens element is R10, and a curvature radius of the image-side surface of the third lens element is R6, the following condition is satisfied: 0<R10/R6<1.0. Therefore, it is favorable for effectively correcting the Petzval Sum. Preferably, the following condition is satisfied: 0<R10/R6<0.5.

When the focal length of the imaging optical lens system is f, and the focal length of the fourth lens element is f4, the following condition is satisfied: −0.7<f/f4<0.3. Therefore, it is favorable for further correcting the aberration. Preferably, the following condition is satisfied: −0.6<f/f4<0.

When an axial distance between the second lens element and the third lens element is T23, and a central thickness of the third lens element is CT3, the following condition is satisfied: 0.2<CT3/T23<3.0. Therefore, it is favorable for assembling the lens elements so as to improve the manufacturing yield rate.

When an axial distance between the first lens element and the second lens element is T12, an axial distance between the fourth lens element and the fifth lens element is T45, an axial distance between the second lens element and the third lens element is T23, and an axial distance between the third lens element and the fourth lens element is T34, the following condition is satisfied: 0<(T12+T45)/(T23+T34)<0.40. Therefore, it is favorable for properly adjusting the axial distance between every lens elements so as to keep the imaging optical lens system compact.

When an Abbe number of the second lens element is V2, and an Abbe number of the fourth lens element is V4, the following condition is satisfied: 0.8<V2/V4<1.3. Therefore, it is favorable for effectively correcting the chromatic aberration of the imaging optical lens system.

When the focal length of the imaging optical lens system is f, a focal length of the third lens element is f3, and the focal length of the fifth lens element is f5, the following condition is satisfied: 0<|f/f3|+|f/f5|<0.5. Therefore, it is favorable for balancing the arrangement of the refractive powers so as to keep the imaging optical lens system compact and reduce the sensitivity thereof.

According to the imaging optical lens system of the present disclosure, the lens elements thereof can be made of glass or plastic material. When the lens elements are made of glass material, the distribution of the refractive power of the imaging optical lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the imaging optical lens system can also be reduced.

According to the imaging optical lens system of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the imaging optical lens system of the present disclosure, the imaging optical lens system can include at least one stop, such as an aperture stop, a glare stop or a field stop. Said glare stop or said field stop is for eliminating the stray light and thereby improving the image resolution thereof.

According to the imaging optical lens system of the present disclosure, an aperture stop can be configured as a front stop or a middle stop. A front stop disposed between an imaged object and the first lens element can provide a longer distance between an exit pupil of the imaging optical lens system and the image plane and thereby improves the image-sensing efficiency of an image sensor. A middle stop disposed between the first lens element and the image plane is favorable for enlarging the field of view of the imaging optical lens system and thereby provides a wider field of view for the same.

The present imaging optical lens system can be optionally applied to moving focus or zoom optical systems. According to the imaging optical lens system of the present disclosure, the imaging optical lens system is featured with good correction ability and high image quality, and can be applied to 3D (three-dimensional) image capturing applications, in products such as digital cameras, mobile devices, digital tablets, wearable devices and other mobile terminals.

According to the present disclosure, an imaging device is provided. The imaging device includes the imaging optical lens system according to the foregoing imaging optical lens system of the present disclosure, and an image sensor, wherein the image sensor is disposed on an image plane of the foregoing imaging optical lens system. Therefore, the imaging device can obtain best image quality through the design of the imaging optical lens system. Preferably, the imaging device can further include a barrel member, a holding member or a combination thereof.

Figure 13B:
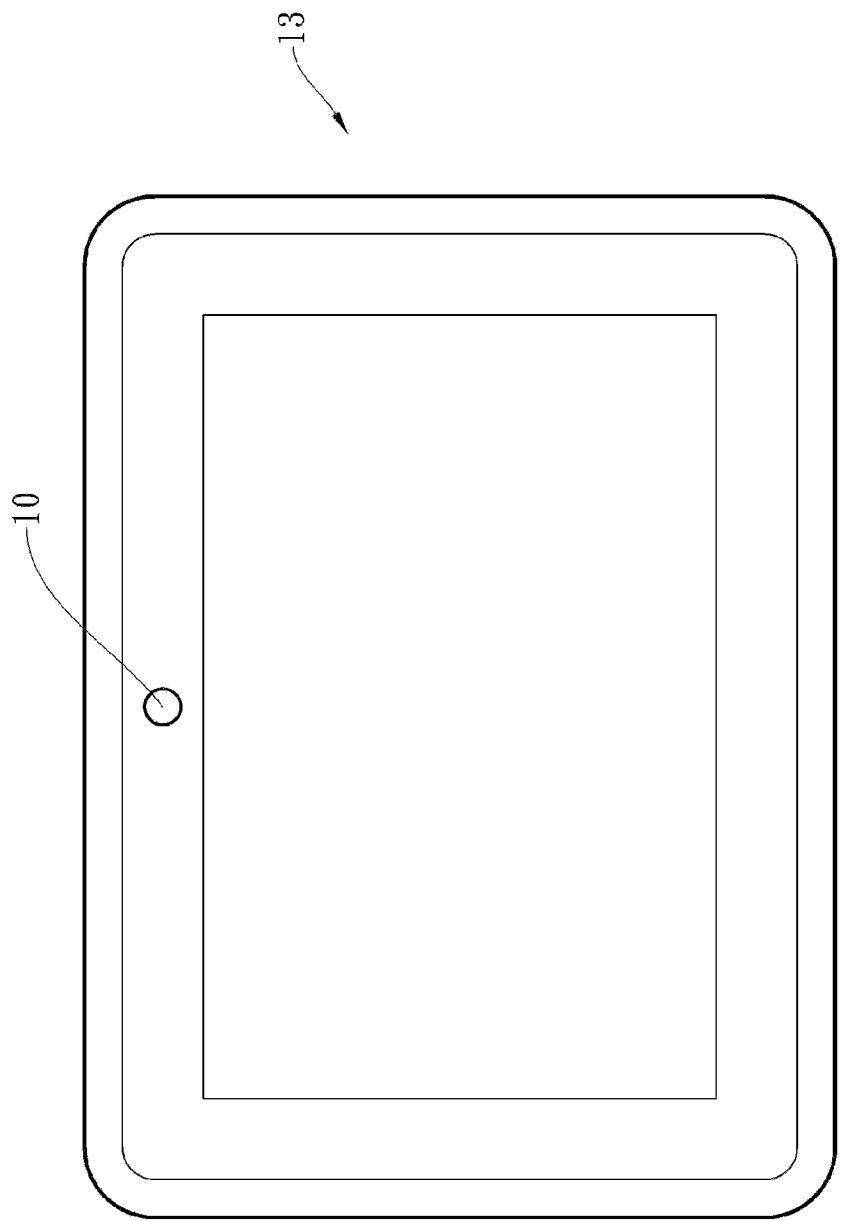
FIG. 13B shows a tablet personal computer with an imaging device of the present disclosure installed therein.
Figure 13C:
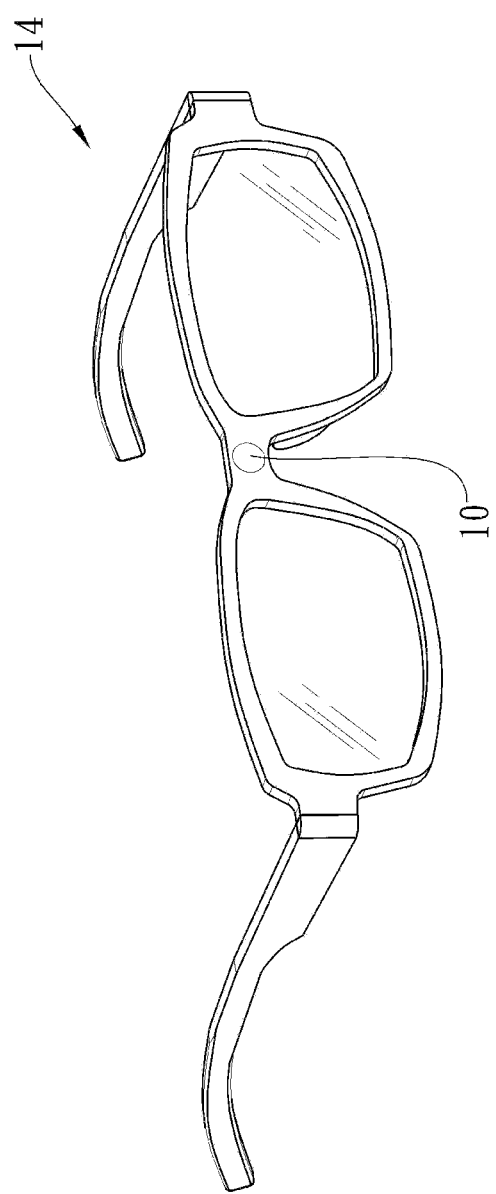
FIG. 13C shows a wearable device with an imaging device of the present disclosure installed therein.

In FIG. 13A, FIG. 13B and FIG. 13C, an imaging device 10 may be installed in but not limited to a mobile terminal, including a smart phone 12, a tablet personal computer 13 or a wearable device 14. The three exemplary figures of different kinds of mobile terminal are only exemplary for showing the imaging device of present disclosure installing in a mobile terminal and is not limited thereto. Preferably, the mobile terminal can further include but not limited to display, control unit, random access memory unit (RAM) a read only memory unit (ROM) or a combination thereof.

According to the above description of the present disclosure, the following 1st-11th specific embodiments are provided for further explanation.

1st Embodiment

Figure 1B:
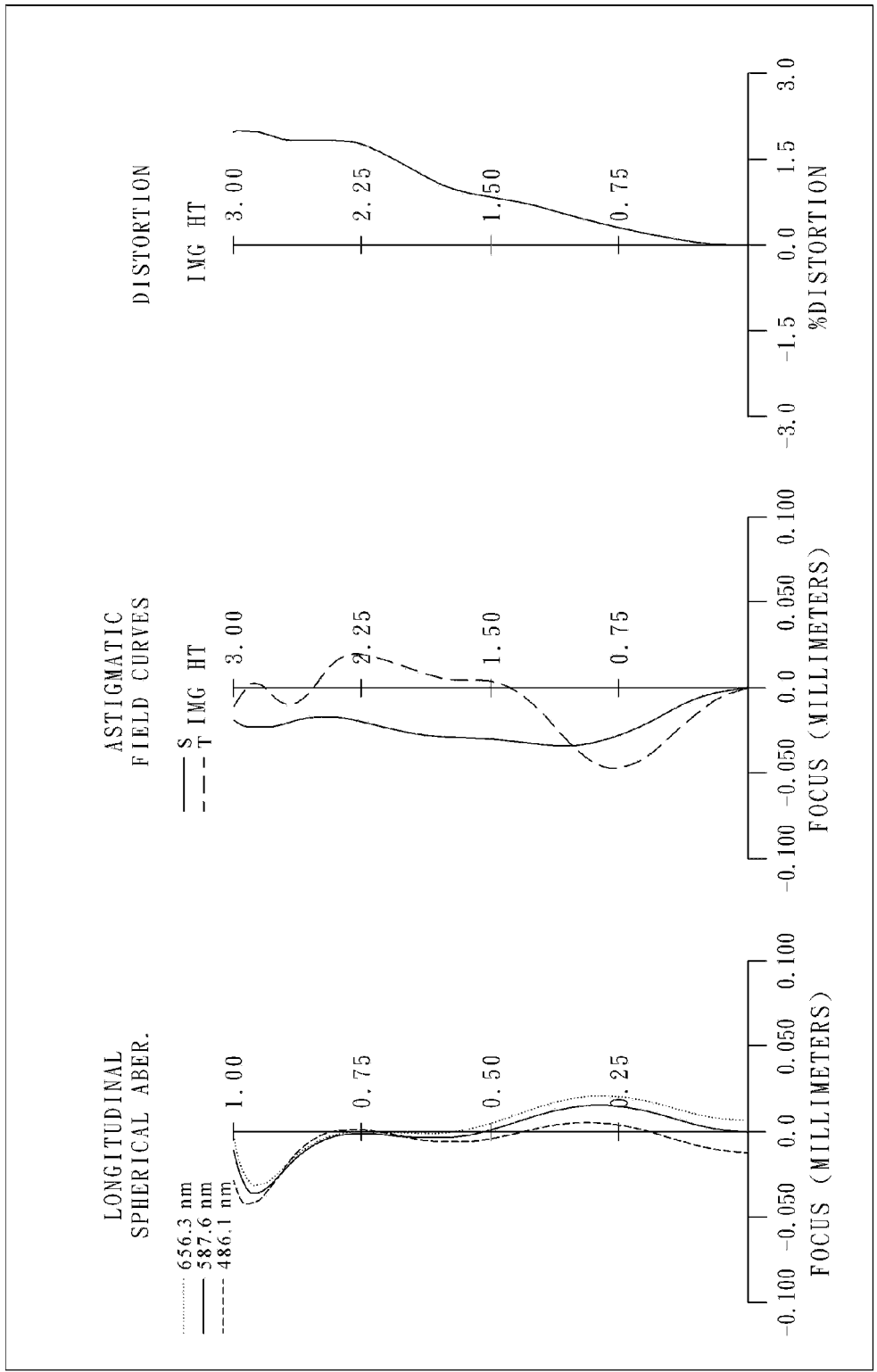
FIG. 1B shows spherical aberration curves, astigmatic field curves and a distortion curve of the imaging device according to the 1st embodiment.

FIG. 1A is a schematic view of an imaging device according to the 1st embodiment of the present disclosure. FIG. 1B shows, in order from left to right, spherical aberration curves, astigmatic field curves and a distortion curve of the imaging device according to the 1st embodiment.

In FIG. 1A, the imaging device includes the imaging optical lens system (not otherwise herein labeled) of the present disclosure and an image sensor 180. The imaging optical lens system includes, in order from an object side to an image side, an aperture stop 100, a first lens element 110, a second lens element 120, a third lens element 130, a fourth lens element 140, a fifth lens element 150, an IR-cut filter 160 and an image plane 170, wherein the imaging optical lens system has a total of five lens elements (110-150) with refractive power.

The first lens element 110 with positive refractive power has an object-side surface 111 being convex in a paraxial region thereof and an image-side surface 112 being concave in a paraxial region thereof, and is made of plastic material. The object-side surface 111 and the image-side surface 112 of the first lens element 110 are aspheric.

The second lens element 120 with negative refractive power has an object-side surface 121 being concave in a paraxial region thereof and an image-side surface 122 being concave in a paraxial region thereof, and is made of plastic material. The object-side surface 121 and the image-side surface 122 of the second lens element 120 are aspheric.

The third lens element 130 with positive refractive power has an object-side surface 131 being convex in a paraxial region thereof and an image-side surface 132 being concave in a paraxial region thereof, and is made of plastic material. The object-side surface 131 and the image-side surface 132 of the third lens element 130 are aspheric.

The fourth lens element 140 with negative refractive power has an object-side surface 141 being concave in a paraxial region thereof and an image-side surface 142 being concave in a paraxial region thereof, and is made of plastic material. The object-side surface 141 and the image-side surface 142 of the fourth lens element 140 are aspheric. Furthermore, both of the object-side surface 141 and the image-side surface 142 of the fourth lens element 140 have at least one inflection point.

The fifth lens element 150 with negative refractive power has an object-side surface 151 being convex in a paraxial region thereof and an image-side surface 152 being concave in a paraxial region thereof, and is made of plastic material. The object-side surface 151 and the image-side surface 152 of the fifth lens element 150 are aspheric. Furthermore, both of the object-side surface 151 and the image-side surface 152 of the fifth lens element 150 have at least one inflection point, wherein the object-side surface 151 of the fifth lens element 150 is convex in a paraxial region thereof and changes to a concave shape and then a convex shape from the paraxial region to a peripheral region.

The IR-cut filter 160 is made of glass and located between the fifth lens element 150 and the image plane 170, and will not affect the focal length of the imaging optical lens system. The image sensor 180 is disposed on the image plane 170 of the imaging optical lens system.

The equation of the aspheric surface profiles of the aforementioned lens elements of the 1st embodiment is expressed as follows:

$$X(Y) = (Y^2/R)/(1 + \mathrm{sqrt}(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging optical lens system of the imaging device according to the 1st embodiment, when a focal length of the imaging optical lens system is f, an f-number of the imaging optical lens system is Fno, and half of a maximal field of view of the imaging optical lens system is HFOV, these parameters have the following values: f=3.66 mm; Fno=2.05; and HFOV=38.8 degrees.

In the imaging optical lens system of the imaging device according to the 1st embodiment, when an Abbe number of the second lens element 120 is V2, and an Abbe number of the fourth lens element 140 is V4, the following condition is satisfied: V2/V4=1.00.

In the imaging optical lens system according to the 1st embodiment, a central thickness of the third lens element 130 is CT3, and an axial distance between the second lens element 120 and the third lens element 130 is T23, the following condition is satisfied: CT3/T23=0.73.

In the imaging optical lens system according to the 1st embodiment, a central thickness of the fourth lens element 140 is CT4, and a central thickness of the fifth lens element 150 is CT5, the following condition is satisfied: CT5/CT4=2.54.

In the imaging optical lens system according to the 1st embodiment, an axial distance between the first lens element 110 and the second lens element 120 is T12, the axial distance between the second lens element 120 and the third lens element 130 is T23, an axial distance between the third lens element 130 and the fourth lens element 140 is T34, and an axial distance between the fourth lens element 140 and the fifth lens element 150 is T45, the following condition is satisfied: (T12+T45)/(T23+T34)=0.14.

In the imaging optical lens system of the imaging device according to the 1st embodiment, when a curvature radius of the image-side surface 152 of the fifth lens element 150 is R10, and a curvature radius of the image-side surface 132 of the third lens element 130 is R6, the following condition is satisfied: R10/R6=0.15.

In the imaging optical lens system of the imaging device according to the 1st embodiment, when the focal length of the imaging optical lens system is f, and a curvature radius of the image-side surface 142 of the fourth lens element 140 is R8, the following condition is satisfied: f/R8=0.12.

In the imaging optical lens system of the imaging device according to the 1st embodiment, when the focal length of the imaging optical lens system is f, and a focal length of the second lens element 120 is f2, the following condition is satisfied: If/f21=0.58.

In the imaging optical lens system of the imaging device according to the 1st embodiment, when the focal length of the imaging optical lens system is f, and a focal length of the fourth lens element 140 is f4, the following condition is satisfied: f/f4=−0.27.

In the imaging optical lens system of the imaging device according to the 1st embodiment, when the focal length of the fourth lens element 140 is f4, and a focal length of the fifth lens element 150 is f5, the following condition is satisfied: f4/f5=0.45.

In the imaging optical lens system of the imaging device according to the 1st embodiment, when the focal length of the imaging optical lens system is f, a focal length of the third lens element 130 is f3, and the focal length of the fifth lens element 150 is f5, the following condition is satisfied: $|f/f3|+|f/f5|=0.20$.

In the imaging optical lens system according to the 1st embodiment, when an axial distance between the object-side surface 111 of the first lens element 110 and the image-side surface 152 of the fifth lens element 150 is TD, and a vertical distance between a maximum effective radius position on the image-side surface 152 of the fifth lens element 150 and an optical axis is SD52, the following condition is satisfied: $TD/(2*SD52)=0.68$.

In the imaging optical lens system according to the 1st embodiment, when an axial distance between the object-side surface 111 of the first lens element 110 and the image plane 170 is TL, and a maximum image height of the imaging optical lens system (half of a diagonal length of an effective photosensitive area of the image sensor 180) is ImgH, the following condition is satisfied: $TL/ImgH=1.41$.

The detailed optical data of the 1st embodiment are shown in Table 1 and the aspheric surface data are shown in Table 2 below.

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. This information related to Table 1 and Table 2 applies also to the Tables for the remaining embodiments, and so an explanation in this regard will not be provided again.

2nd Embodiment

Figure 2A:
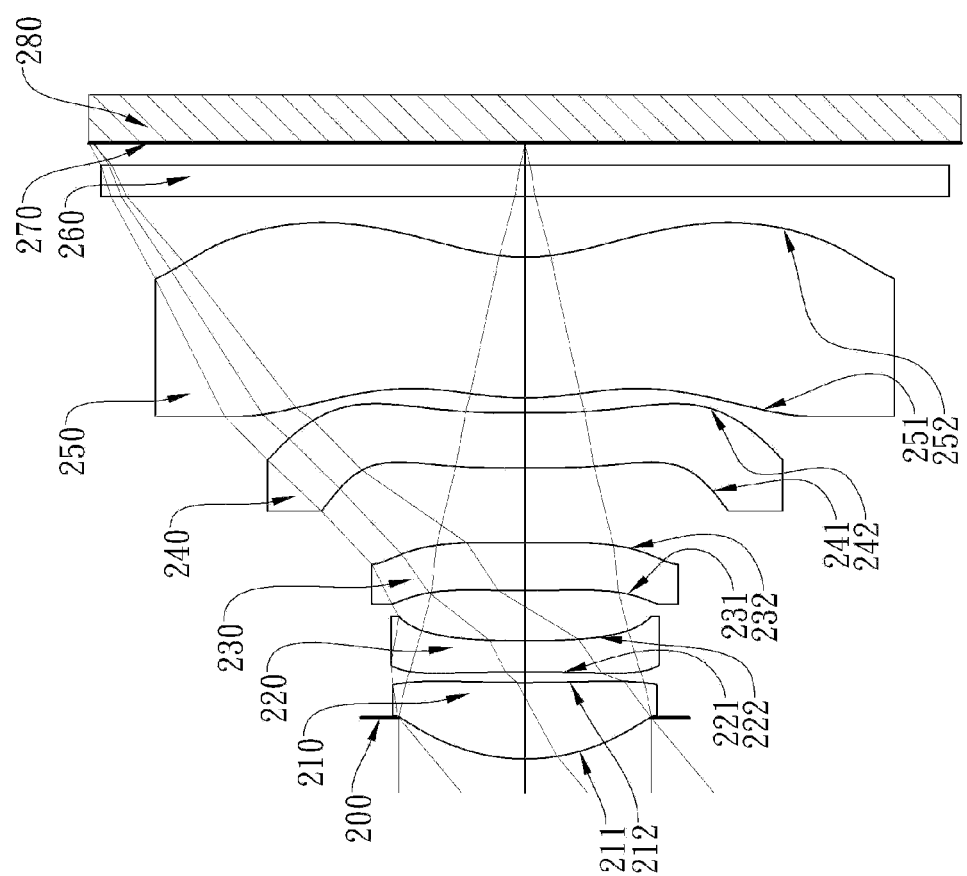
FIG. 2A is a schematic view of an imaging device according to the 2nd embodiment of the present disclosure.
Figure 2B:
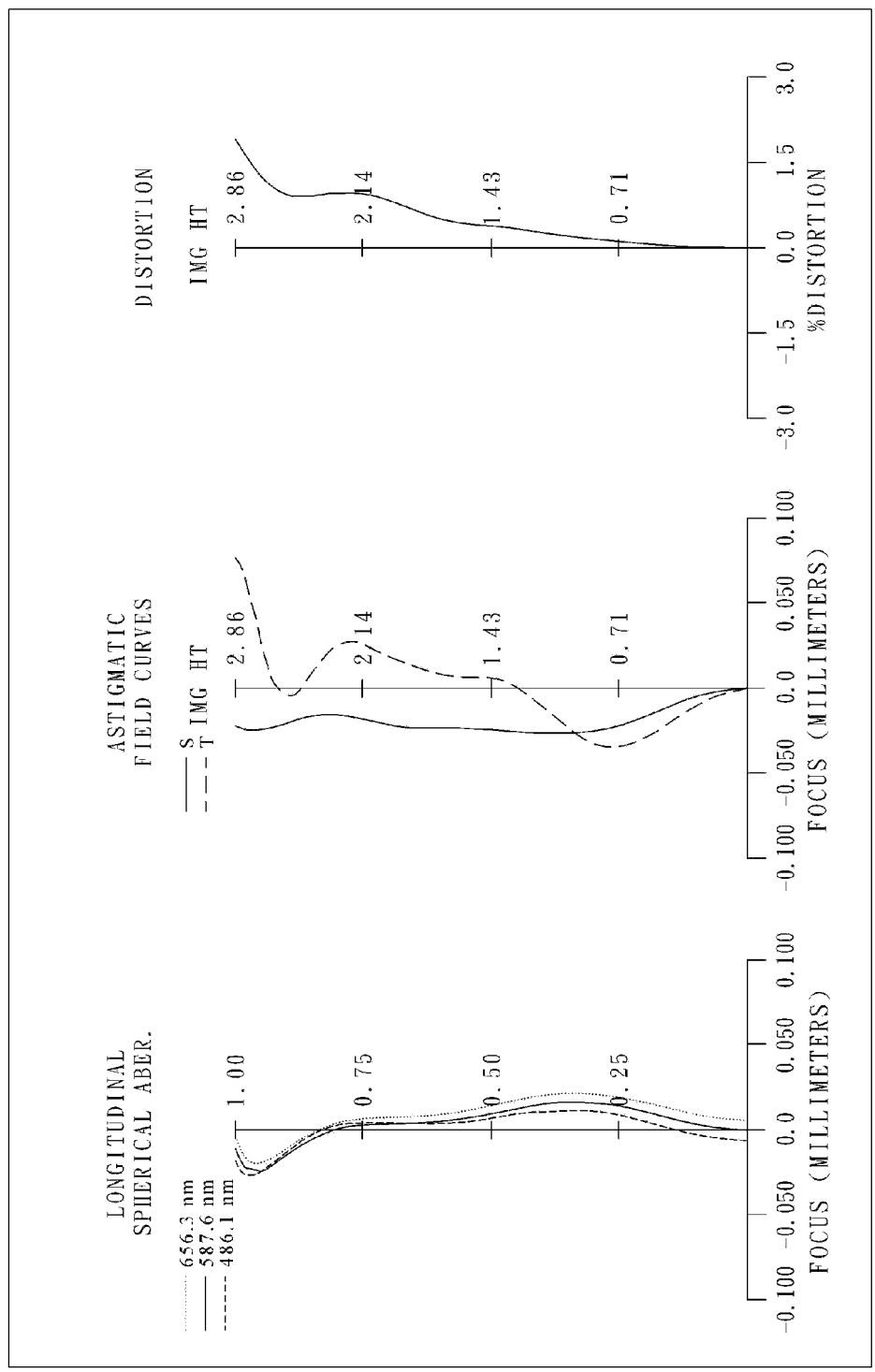
FIG. 2B shows spherical aberration curves, astigmatic field curves and a distortion curve of the imaging device according to the 2nd embodiment.

FIG. 2A is a schematic view of an imaging device according to the 2nd embodiment of the present disclosure. FIG. 2B shows, in order from left to right, spherical aberration curves, astigmatic field curves and a distortion curve of the imaging device according to the 2nd embodiment.

In FIG. 2A, the imaging device includes the imaging optical lens system (not otherwise herein labeled) of the present disclosure and an image sensor 280. The imaging optical lens

TABLE 1

1st Embodiment
f = 3.66 mm, Fno = 2.05, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.313 | | | | |
| 2 | Lens 1 | 1.311 | ASP | 0.570 | Plastic | 1.544 | 55.9 | 2.66 |
| 3 | | 11.816 | ASP | 0.055 | | | | |
| 4 | Lens 2 | −11.228 | ASP | 0.251 | Plastic | 1.640 | 23.3 | −6.34 |
| 5 | | 6.402 | ASP | 0.366 | | | | |
| 6 | Lens 3 | 7.335 | ASP | 0.266 | Plastic | 1.640 | 23.3 | 44.65 |
| 7 | | 9.729 | ASP | 0.540 | | | | |
| 8 | Lens 4 | −12.373 | ASP | 0.363 | Plastic | 1.640 | 23.3 | −13.78 |
| 9 | | 31.023 | ASP | 0.070 | | | | |
| 10 | Lens 5 | 1.998 | ASP | 0.922 | Plastic | 1.544 | 55.9 | −30.88 |
| 11 | | 1.496 | ASP | 0.400 | | | | |
| 12 | IR-cut filter | Plano | | 0.210 | Glass | 1.517 | 64.2 | — |
| 13 | | Plano | | 0.225 | | | | |
| 14 | Image | Plano | | — | | | | |

Note:
Reference wavelength is 587.6 nm (d-line).

TABLE 2

Aspheric Coefficients

| Surface # | 2 | 3 | 4 | 5 | 6 |
|---|---|---|---|---|---|
| k = | 9.8077E−03 | −1.0000E+00 | 4.7208E+00 | 1.8728E+00 | −1.8917E+01 |
| A4 = | −2.3323E−02 | −7.7742E−02 | −6.0424E−02 | 1.8926E−02 | −1.7775E−01 |
| A6 = | 1.1870E−01 | −2.5842E−01 | 4.6781E−02 | 2.1114E−01 | −2.5421E−01 |
| A8 = | −3.7649E−01 | 1.1929E+00 | 7.5647E−01 | −1.7898E−02 | −8.6590E−02 |
| A10 = | 5.2433E−01 | −2.2539E+00 | −1.8375E+00 | 3.2432E−02 | 3.1521E+00 |
| A12 = | −3.9212E−01 | 1.9895E+00 | 1.9821E+00 | −2.8787E−01 | −9.0201E+00 |
| A14 = | 2.8611E−02 | −7.0385E−01 | −7.4115E−01 | 5.3567E−01 | 1.0258E+01 |
| A16 = | | | | | −4.1666E+00 |

| Surface # | 7 | 8 | 9 | 10 | 11 |
|---|---|---|---|---|---|
| k = | −2.4928E+01 | −1.7129E+01 | −1.0000E+00 | −1.0880E+00 | −3.6899E+00 |
| A4 = | −1.5324E−01 | 3.6368E−01 | 1.5016E−01 | −3.8828E−01 | −1.7443E−01 |
| A6 = | 7.3889E−03 | −7.4219E−01 | −2.0451E−01 | 2.5343E−01 | 1.0880E−01 |
| A8 = | −8.7548E−01 | 7.9032E−01 | 1.2070E−01 | −1.0126E−01 | −5.4300E−02 |
| A10 = | 2.9868E+00 | −6.0328E−01 | −5.8364E−02 | 2.6082E−02 | 1.7585E−02 |
| A12 = | −4.5338E+00 | 2.6133E−01 | 2.0881E−02 | −4.1733E−03 | −3.3680E−03 |
| A14 = | 3.3158E+00 | −6.0577E−02 | −4.1847E−03 | 3.7690E−04 | 3.4142E−04 |
| A16 = | −9.1257E−01 | 7.0919E−03 | 3.3573E−04 | −1.4698E−05 | −1.3985E−05 | system includes, in order from an object side to an image side, an aperture stop 200, a first lens element 210, a second lens element 220, a third lens element 230, a fourth lens element 240, a fifth lens element 250, an IR-cut filter 260 and an image plane 270, wherein the imaging optical lens system has a total of five lens elements (210-250) with refractive power.

The first lens element 210 with positive refractive power has an object-side surface 211 being convex in a paraxial region thereof and an image-side surface 212 being concave in a paraxial region thereof, and is made of plastic material. The object-side surface 211 and the image-side surface 212 of the first lens element 210 are aspheric.

The second lens element 220 with negative refractive power has an object-side surface 221 being concave in a paraxial region thereof and an image-side surface 222 being concave in a paraxial region thereof, and is made of plastic material. The object-side surface 221 and the image-side surface 222 of the second lens element 220 are aspheric.

The third lens element 230 with positive refractive power has an object-side surface 231 being convex in a paraxial region thereof and an image-side surface 232 being concave in a paraxial region thereof, and is made of plastic material. The object-side surface 231 and the image-side surface 232 of the third lens element 230 are aspheric.

The fourth lens element 240 with negative refractive power has an object-side surface 241 being convex in a paraxial region thereof and an image-side surface 242 being concave in a paraxial region thereof, and is made of plastic material. The object-side surface 241 and the image-side surface 242 of the fourth lens element 240 are aspheric. Furthermore, both of the object-side surface 241 and the image-side surface 242 of the fourth lens element 240 have at least one inflection point.

The fifth lens element 250 with negative refractive power has an object-side surface 251 being convex in a paraxial region thereof and an image-side surface 252 being concave in a paraxial region thereof, and is made of plastic material. The object-side surface 251 and the image-side surface 252 of the fifth lens element 250 are aspheric. Furthermore, both of the object-side surface 251 and the image-side surface 252 of the fifth lens element 250 have at least one inflection point, wherein the object-side surface 251 of the fifth lens element 250 is convex in a paraxial region thereof and changes to a concave shape and then a convex shape from the paraxial region to a peripheral region.

The IR-cut filter 260 is made of glass and located between the fifth lens element 250 and the image plane 270, and will not affect the focal length of the imaging optical lens system. The image sensor 280 is disposed on the image plane 270 of the imaging optical lens system.

The detailed optical data of the 2nd embodiment are shown in Table 3 and the aspheric surface data are shown in Table 4 below.

TABLE 3

2nd Embodiment
f = 3.34 mm, Fno = 2.00, HFOV = 39.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.272 | | | | |
| 2 | Lens 1 | 1.323 | ASP | 0.505 | Plastic | 1.544 | 55.9 | 2.80 |
| 3 | | 8.752 | ASP | 0.069 | | | | |
| 4 | Lens 2 | −36.685 | ASP | 0.207 | Plastic | 1.650 | 21.4 | −6.83 |
| 5 | | 5.057 | ASP | 0.334 | | | | |
| 6 | Lens 3 | 9.479 | ASP | 0.319 | Plastic | 1.544 | 55.9 | 19.28 |
| 7 | | 97.044 | ASP | 0.494 | | | | |
| 8 | Lens 4 | 99.149 | ASP | 0.365 | Plastic | 1.650 | 21.4 | −16.84 |
| 9 | | 9.841 | ASP | 0.100 | | | | |
| 10 | Lens 5 | 1.796 | ASP | 0.935 | Plastic | 1.544 | 55.9 | −30.79 |
| 11 | | 1.324 | ASP | 0.400 | | | | |
| 12 | IR-cut filter | Plano | | 0.210 | Glass | 1.517 | 64.2 | — |
| 13 | | Plano | | 0.147 | | | | |
| 14 | Image | Plano | | — | | | | |

Note:
Reference wavelength is 587.6 nm (d-line).

TABLE 4

Aspheric Coefficients

| Surface # | 2 | 3 | 4 | 5 | 6 |
|---|---|---|---|---|---|
| k = | 1.2278E−02 | −1.0000E+00 | 3.9434E+00 | −7.0243E+00 | 4.9145E+00 |
| A4 = | −2.3249E−02 | −6.7598E−02 | −7.0414E−02 | 1.3522E−02 | −1.6297E−01 |
| A6 = | 1.1890E−01 | −2.6739E−01 | 5.5379E−02 | 2.1564E−01 | −2.3462E−01 |
| A8 = | −3.8123E−01 | 1.1688E+00 | 7.5061E−01 | −1.0965E−02 | −1.2050E−01 |
| A10 = | 5.2550E−01 | −2.2619E+00 | −1.8221E+00 | 8.2631E−02 | 3.1392E+00 |
| A12 = | −4.0021E−01 | 2.0020E+00 | 1.9956E+00 | −2.8567E−01 | −8.9885E+00 |
| A14 = | 5.5307E−03 | −6.9293E−01 | −7.4102E−01 | 4.7316E−01 | 1.0316E+01 |
| A16 = | | | | | −4.1666E+00 |

| Surface # | 7 | 8 | 9 | 10 | 11 |
|---|---|---|---|---|---|
| k = | −1.0000E+00 | −1.0000E+00 | −1.0000E+00 | −1.6052E+00 | −3.4721E+00 |
| A4 = | −1.2037E−01 | 3.5376E−01 | 1.3602E−01 | −3.9726E−01 | −1.6768E−01 |

TABLE 4-continued

Aspheric Coefficients

| A6 = | −3.0435E−02 | −7.3442E−01 | −2.0133E−01 | 2.5479E−01 | 1.0858E−01 |
|---|---|---|---|---|---|
| A8 = | −8.7496E−01 | 7.8973E−01 | 1.1783E−01 | −1.0100E−01 | −5.4354E−02 |
| A10 = | 2.9962E+00 | −6.0282E−01 | −5.8386E−02 | 2.6111E−02 | 1.7591E−02 |
| A12 = | −4.5265E+00 | 2.6201E−01 | 2.0957E−02 | −4.1722E−03 | −3.3643E−03 |
| A14 = | 3.3185E+00 | −6.0729E−02 | −4.1720E−03 | 3.7605E−04 | 3.4123E−04 |
| A16 = | −9.0979E−01 | 6.8869E−03 | 3.3653E−04 | −1.5041E−05 | −1.4034E−05 |

In the imaging optical lens system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following conditions:

| 2nd Embodiment | | | |
|---|---|---|---|
| f [mm] | 3.34 | f/R8 | 0.34 |
| Fno | 2.00 | |f/f2| | 0.49 |
| HFOV [deg.] | 39.9 | f/f4 | −0.20 |
| V2/V4 | 1.00 | f4/f5 | 0.55 |
| CT3/T23 | 0.96 | |f/f3| + |f/f5| | 0.28 |
| CT5/CT4 | 2.56 | TD/(2*SD52) | 0.68 |
| (T12 + T45)/(T23 + T34) | 0.20 | TL/ImgH | 1.43 |
| R10/R6 | 0.01 | | |

3rd Embodiment

Figure 3A:
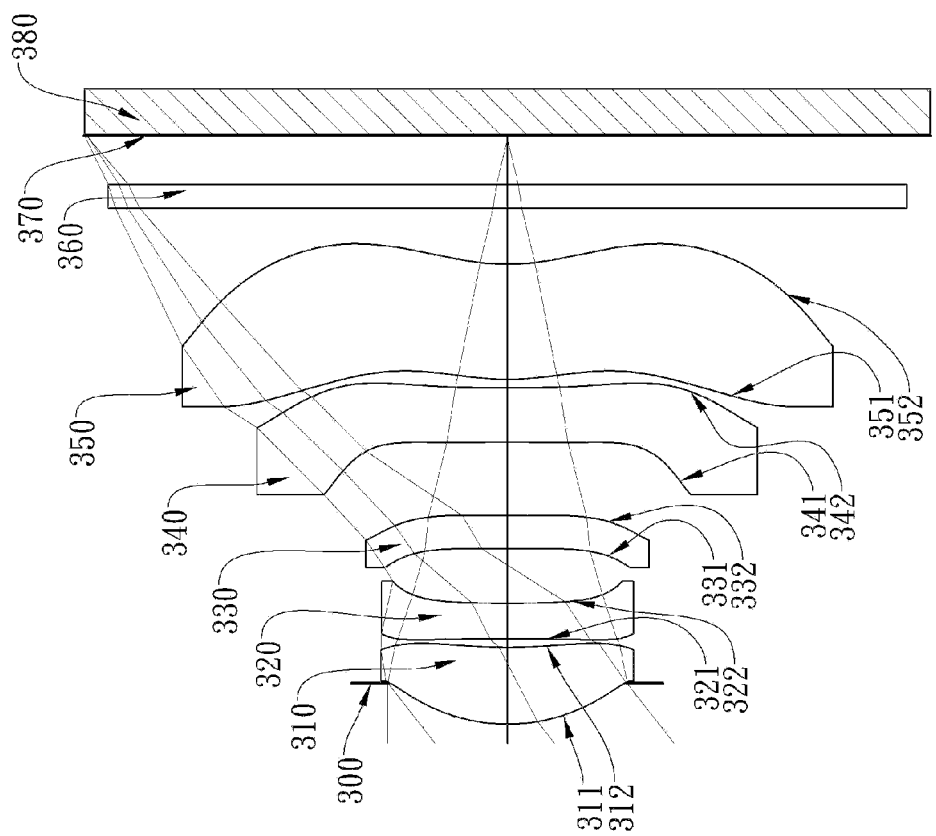
FIG. 3A is a schematic view of an imaging device according to the 3rd embodiment of the present disclosure.
Figure 3B:
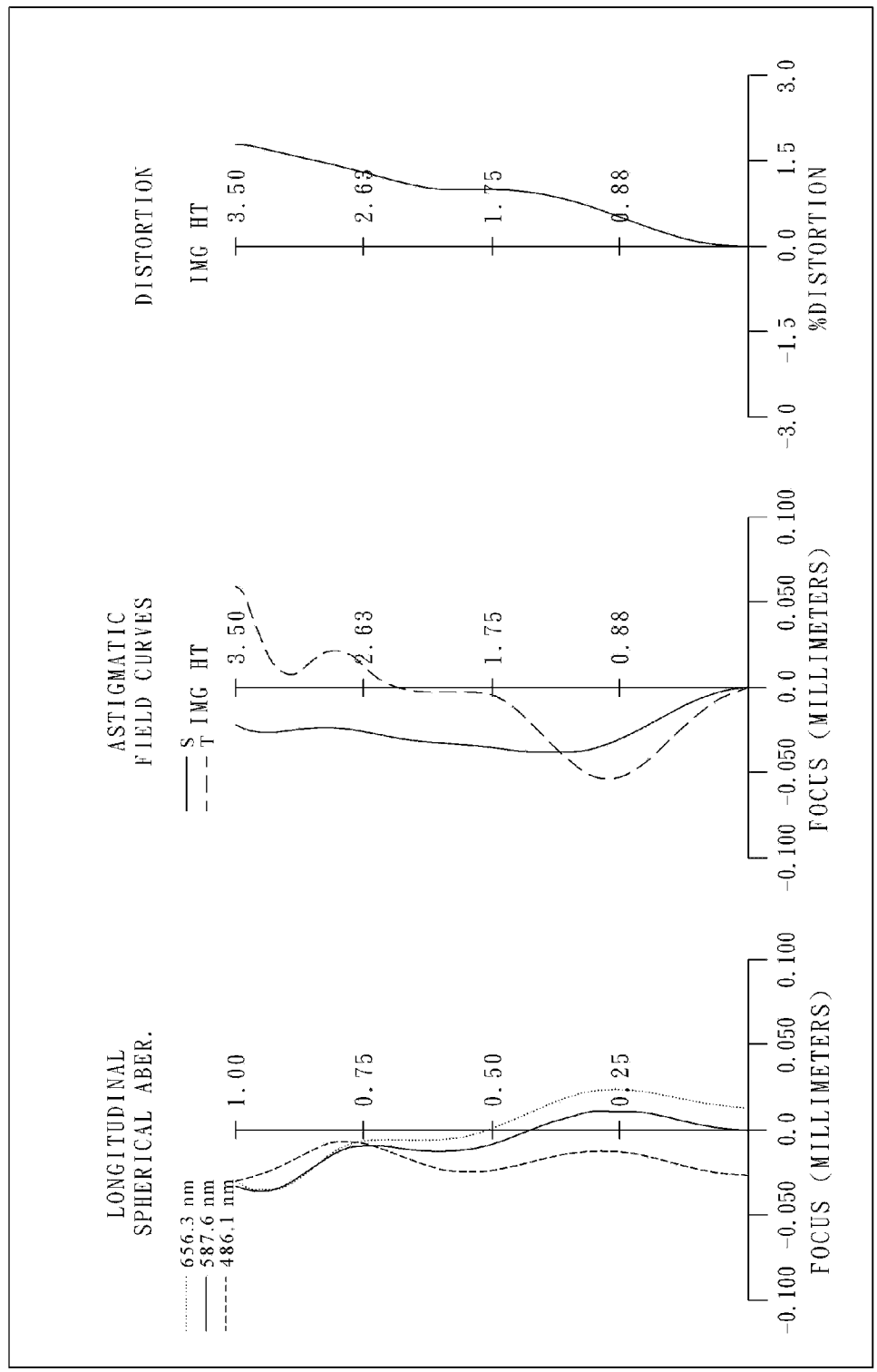
FIG. 3B shows spherical aberration curves, astigmatic field curves and a distortion curve of the imaging device according to the 3rd embodiment.

FIG. 3A is a schematic view of an imaging device according to the 3rd embodiment of the present disclosure. FIG. 3B shows, in order from left to right, spherical aberration curves, astigmatic field curves and a distortion curve of the imaging device according to the 3rd embodiment.

In FIG. 3A, the imaging device includes the imaging optical lens system (not otherwise herein labeled) of the present disclosure and an image sensor 380. The imaging optical lens system includes, in order from an object side to an image side, an aperture stop 300, a first lens element 310, a second lens element 320, a third lens element 330, a fourth lens element 340, a fifth lens element 350, an IR-cut filter 360 and an image plane 370, wherein the imaging optical lens system has a total of five lens elements (310-350) with refractive power.

The first lens element 310 with positive refractive power has an object-side surface 311 being convex in a paraxial region thereof and an image-side surface 312 being concave in a paraxial region thereof, and is made of plastic material. The object-side surface 311 and the image-side surface 312 of the first lens element 310 are aspheric.

The second lens element 320 with negative refractive power has an object-side surface 321 being convex in a paraxial region thereof and an image-side surface 322 being concave in a paraxial region thereof, and is made of plastic material. The object-side surface 321 and the image-side surface 322 of the second lens element 320 are aspheric.

The third lens element 330 with positive refractive power has an object-side surface 331 being convex in a paraxial region thereof and an image-side surface 332 being concave in a paraxial region thereof, and is made of plastic material. The object-side surface 331 and the image-side surface 332 of the third lens element 330 are aspheric.

The fourth lens element 340 with negative refractive power has an object-side surface 341 being concave in a paraxial region thereof and an image-side surface 342 being concave in a paraxial region thereof, and is made of plastic material. The object-side surface 341 and the image-side surface 342 of the fourth lens element 340 are aspheric. Furthermore, both of the object-side surface 341 and the image-side surface 342 of the fourth lens element 340 have at least one inflection point.

The fifth lens element 350 with positive refractive power has an object-side surface 351 being convex in a paraxial region thereof and an image-side surface 352 being concave in a paraxial region thereof, and is made of plastic material. The object-side surface 351 and the image-side surface 352 of the fifth lens element 350 are aspheric. Furthermore, both of the object-side surface 351 and the image-side surface 352 of the fifth lens element 350 have at least one inflection point, wherein the object-side surface 351 of the fifth lens element 350 is convex in a paraxial region thereof and changes to a concave shape and then a convex shape from the paraxial region to a peripheral region.

The IR-cut filter 360 is made of glass and located between the fifth lens element 350 and the image plane 370, and will not affect the focal length of the imaging optical lens system. The image sensor 380 is disposed on the image plane 370 of the imaging optical lens system.

The detailed optical data of the 3rd embodiment are shown in Table 5 and the aspheric surface data are shown in Table 6 below.

TABLE 5

3rd Embodiment
f = 4.38 mm, Fno = 2.20, HFOV = 38.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.340 | | | | |
| 2 | Lens 1 | 1.477 | ASP | 0.641 | Plastic | 1.565 | 56.5 | 3.69 |
| 3 | | 4.261 | ASP | 0.068 | | | | |
| 4 | Lens 2 | 88.658 | ASP | 0.298 | Plastic | 1.640 | 23.3 | −17.51 |
| 5 | | 9.933 | ASP | 0.454 | | | | |
| 6 | Lens 3 | 15.519 | ASP | 0.277 | Plastic | 1.640 | 23.3 | 125.72 |
| 7 | | 19.096 | ASP | 0.614 | | | | |
| 8 | Lens 4 | −9.343 | ASP | 0.454 | Plastic | 1.640 | 23.3 | −11.17 |

TABLE 5-continued

3rd Embodiment
f = 4.38 mm, Fno = 2.20, HFOV = 38.2 deg.

| Surface # | | Curvature Radius | | Thickness | Material | Index | Abbe # | Focal Length |
|---|---|---|---|---|---|---|---|---|
| 9 | | 31.023 | ASP | 0.070 | | | | |
| 10 | Lens 5 | 2.114 | ASP | 0.960 | Plastic | 1.544 | 55.9 | 459.15 |
| 11 | | 1.791 | ASP | 0.467 | | | | |
| 12 | IR-cut filter | Plano | | 0.200 | Glass | 1.517 | 64.2 | — |
| 13 | | Plano | | 0.405 | | | | |
| 14 | Image | Plano | | — | | | | |

Note:
Reference wavelength is 587.6 nm (d-line).

TABLE 6

Aspheric Coefficients

| Surface # | 2 | 3 | 4 | 5 | 6 |
|---|---|---|---|---|---|
| k = | 2.0278E−02 | −1.0000E+00 | −3.0000E+01 | −2.1697E+01 | −2.7593E+01 |
| A4 = | −1.4081E−02 | −7.7574E−02 | −7.7381E−02 | 1.3829E−02 | −1.1412E−01 |
| A6 = | 4.9139E−02 | −1.6275E−01 | 2.2018E−02 | 1.3812E−01 | −1.2949E−01 |
| A8 = | −1.3212E−01 | 3.9487E−01 | 2.6434E−01 | 2.2852E−02 | −3.7855E−02 |
| A10 = | 1.3728E−01 | −5.4528E−01 | −4.5453E−01 | −7.8202E−03 | 8.0308E−01 |
| A12 = | −6.0392E−02 | 3.8516E−01 | 3.6349E−01 | −5.5523E−02 | −1.6451E+00 |
| A14 = | −1.5846E−02 | −1.1345E−01 | −1.0088E−01 | 8.8655E−02 | 1.3638E+00 |
| A16 = | | | | | −4.1265E−01 |

| Surface # | 7 | 8 | 9 | 10 | 11 |
|---|---|---|---|---|---|
| k = | −3.0000E+01 | −2.9883E+01 | −1.0000E+00 | −2.4083E+00 | −3.9058E+00 |
| A4 = | −1.0390E−01 | 2.1898E−01 | 8.0897E−02 | −2.4569E−01 | −1.1890E−01 |
| A6 = | −6.9892E−03 | −3.4318E−01 | −8.9792E−02 | 1.1766E−01 | 5.1263E−02 |
| A8 = | −2.9606E−01 | 2.6654E−01 | 4.0883E−02 | −3.4367E−02 | −1.8462E−02 |
| A10 = | 7.4589E−01 | −1.5062E−01 | −1.4707E−02 | 6.5144E−03 | 4.3844E−03 |
| A12 = | −8.3227E−01 | 4.7942E−02 | 3.8281E−03 | −7.6579E−04 | −6.1857E−04 |
| A14 = | 4.4668E−01 | −8.1040E−03 | −5.6234E−04 | 5.0754E−05 | 4.6043E−05 |
| A16 = | −9.0324E−02 | 7.6076E−04 | 3.4025E−05 | −1.4570E−06 | −1.3743E−06 |

In the imaging optical lens system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following conditions:

| 3rd Embodiment | | | |
|---|---|---|---|
| f [mm] | 4.38 | f/R8 | 0.14 |
| Fno | 2.20 | |f/f2| | 0.25 |
| HFOV [deg.] | 38.2 | f/f4 | −0.39 |
| V2/V4 | 1.00 | f4/f5 | −0.02 |
| CT3/T23 | 0.61 | |f/f3| + |f/f5| | 0.04 |
| CT5/CT4 | 2.11 | TD/(2*SD52) | 0.71 |
| (T12 + T45)/(T23 + T34) | 0.13 | TL/ImgH | 1.40 |
| R10/R6 | 0.09 | | |

4th Embodiment

Figure 4A:
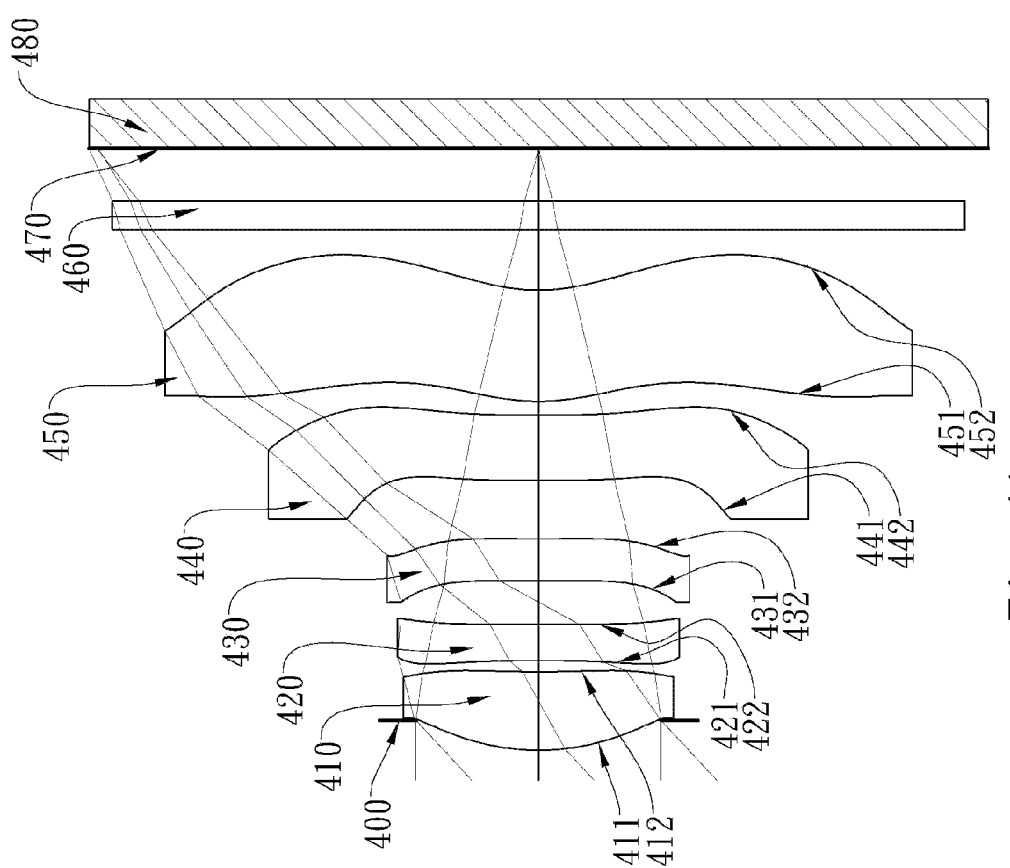
FIG. 4A is a schematic view of an imaging device according to the 4th embodiment of the present disclosure.
Figure 4B:
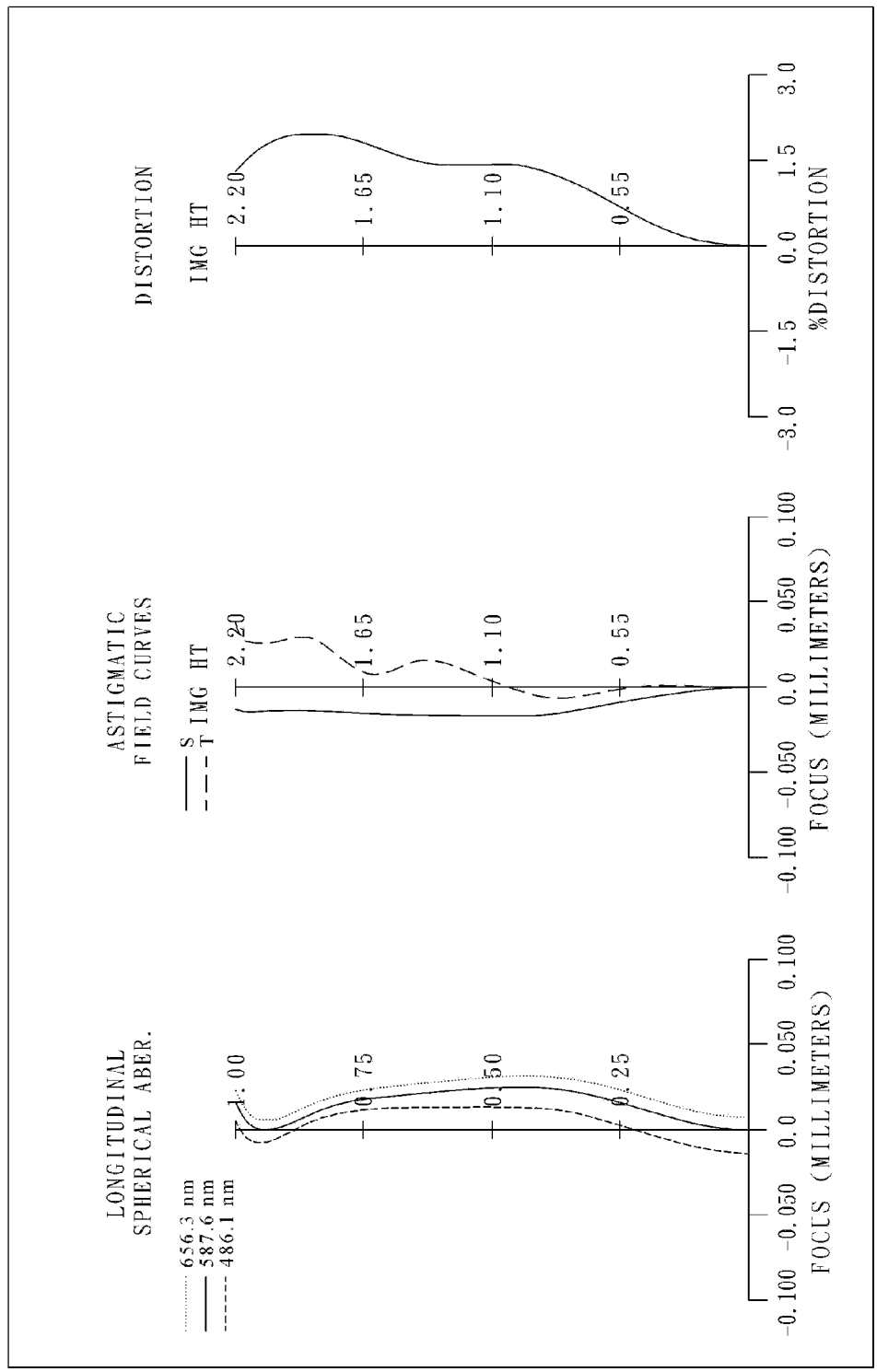
FIG. 4B shows spherical aberration curves, astigmatic field curves and a distortion curve of the imaging device according to the 4th embodiment.

FIG. 4A is a schematic view of an imaging device according to the 4th embodiment of the present disclosure. FIG. 4B shows, in order from left to right, spherical aberration curves, astigmatic field curves and a distortion curve of the imaging device according to the 4th embodiment.

In FIG. 4A, the imaging device includes the imaging optical lens system (not otherwise herein labeled) of the present disclosure and an image sensor 480. The imaging optical lens system includes, in order from an object side to an image side, an aperture stop 400, a first lens element 410, a second lens element 420, a third lens element 430, a fourth lens element 440, a fifth lens element 450, an IR-cut filter 460 and an image plane 470, wherein the imaging optical lens system has a total of five lens elements (410-450) with refractive power.

The first lens element 410 with positive refractive power has an object-side surface 411 being convex in a paraxial region thereof and an image-side surface 412 being concave in a paraxial region thereof, and is made of plastic material. The object-side surface 411 and the image-side surface 412 of the first lens element 410 are aspheric.

The second lens element 420 with negative refractive power has an object-side surface 421 being concave in a paraxial region thereof and an image-side surface 422 being concave in a paraxial region thereof, and is made of plastic material. The object-side surface 421 and the image-side surface 422 of the second lens element 420 are aspheric.

The third lens element 430 with positive refractive power has an object-side surface 431 being convex in a paraxial region thereof and an image-side surface 432 being concave in a paraxial region thereof, and is made of plastic material. The object-side surface 431 and the image-side surface 432 of the third lens element 430 are aspheric.

The fourth lens element 440 with negative refractive power has an object-side surface 441 being concave in a paraxial region thereof and an image-side surface 442 being concave in a paraxial region thereof, and is made of plastic material. The object-side surface 441 and the image-side surface 442 of the fourth lens element 440 are aspheric. Furthermore, both of the object-side surface 441 and the image-side surface 442 of the fourth lens element 440 have at least one inflection point.

The fifth lens element 450 with positive refractive power has an object-side surface 451 being convex in a paraxial region thereof and an image-side surface 452 being concave in a paraxial region thereof, and is made of plastic material. The object-side surface 451 and the image-side surface 452 of the fifth lens element 450 are aspheric. Furthermore, both of the object-side surface 451 and the image-side surface 452 of the fifth lens element 450 have at least one inflection point, wherein the object-side surface 451 of the fifth lens element 450 is convex in a paraxial region thereof and changes to a concave shape and then a convex shape from the paraxial region to a peripheral region.

The IR-cut filter 460 is made of glass and located between the fifth lens element 450 and the image plane 470, and will not affect the focal length of the imaging optical lens system. The image sensor 480 is disposed on the image plane 470 of the imaging optical lens system.

The detailed optical data of the 4th embodiment are shown in Table 7 and the aspheric surface data are shown in Table 8 below.

TABLE 7

4th Embodiment
f = 2.33 mm, Fno = 1.90, HFOV = 42.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.150 | | | | |
| 2 | Lens 1 | 1.135 | ASP | 0.392 | Plastic | 1.565 | 56.5 | 2.45 |
| 3 | | 5.516 | ASP | 0.057 | | | | |
| 4 | Lens 2 | −10.835 | ASP | 0.180 | Plastic | 1.650 | 21.4 | −13.04 |
| 5 | | 39.061 | ASP | 0.218 | | | | |
| 6 | Lens 3 | 9.257 | ASP | 0.211 | Plastic | 1.650 | 21.4 | 43.90 |
| 7 | | 13.582 | ASP | 0.292 | | | | |
| 8 | Lens 4 | −45.822 | ASP | 0.326 | Plastic | 1.650 | 21.4 | −15.24 |
| 9 | | 12.670 | ASP | 0.070 | | | | |
| 10 | Lens 5 | 1.026 | ASP | 0.557 | Plastic | 1.565 | 56.0 | 15.64 |
| 11 | | 0.933 | ASP | 0.300 | | | | |
| 12 | IR-cut filter | Plano | | 0.145 | Glass | 1.517 | 64.2 | — |
| 13 | | Plano | | 0.263 | | | | |
| 14 | Image | Plano | | — | | | | |

Note:
Reference wavelength is 587.6 nm (d-line).

TABLE 8

Aspheric Coefficients

| Surface # | 2 | 3 | 4 | 5 | 6 |
|---|---|---|---|---|---|
| k = | −1.9052E−01 | −1.0000E+00 | 4.0500E+00 | −1.9120E+01 | −3.0000E+01 |
| A4 = | −7.8312E−02 | −2.3970E−01 | −2.1685E−01 | −6.8367E−02 | −4.9648E−01 |
| A6 = | 3.8174E−01 | −1.2608E+00 | 1.5719E−01 | 6.8334E−01 | −3.5596E−01 |
| A8 = | −2.5697E+00 | 7.2832E+00 | 4.6612E+00 | 8.9534E−03 | −1.9174E+00 |
| A10 = | 5.6527E+00 | −2.3597E+01 | −1.9856E+01 | −4.6163E−01 | 3.4978E+01 |
| A12 = | −7.9286E+00 | 3.9222E+01 | 3.9226E+01 | −6.4750E+00 | −1.6387E+02 |
| A14 = | 2.3256E+00 | −2.4238E+01 | −2.6534E+01 | 9.4131E+00 | 3.1777E+02 |
| A16 = | | | | | −2.2422E+02 |

| Surface # | 7 | 8 | 9 | 10 | 11 |
|---|---|---|---|---|---|
| k = | −2.9043E+01 | −3.0000E+01 | −1.0000E+00 | −1.5605E+00 | −3.4293E+00 |
| A4 = | −3.6946E−01 | 8.0338E−01 | 3.3490E−01 | −8.9129E−01 | −3.8997E−01 |
| A6 = | −1.0736E−01 | −2.9468E−01 | −7.8972E−01 | 9.6397E−01 | 4.1235E−01 |
| A8 = | −5.1828E+00 | 5.1320E+00 | 8.0126E−01 | −6.4921E−01 | −3.4925E−01 |
| A10 = | 3.2629E+01 | −6.5488E+00 | −6.4266E−01 | 2.8490E−01 | 1.9235E−01 |
| A12 = | −8.5187E+01 | 4.7810E+00 | 3.8500E−01 | −7.7689E−02 | −6.2592E−02 |
| A14 = | 1.0437E+02 | −1.9300E+00 | −1.3250E−01 | 1.1893E−02 | 1.0797E−02 |
| A16 = | −4.4753E+01 | 4.8529E−01 | 1.8445E−02 | −7.7957E−04 | −7.5535E−04 |

In the imaging optical lens system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f [mm] | 2.33 | f/R8 | 0.18 |
| Fno | 1.90 | |f/f2| | 0.18 |
| HFOV [deg.] | 42.9 | f/f4 | −0.15 |
| V2/V4 | 1.00 | f4/f5 | −0.97 |
| CT3/T23 | 0.97 | |f/f3| + |f/f5| | 0.20 |
| CT5/CT4 | 1.71 | TD/(2*SD52) | 0.62 |
| (T12 + T45)/(T23 + T34) | 0.25 | TL/ImgH | 1.37 |
| R10/R6 | 0.07 | | |

5th Embodiment

Figure 5A:
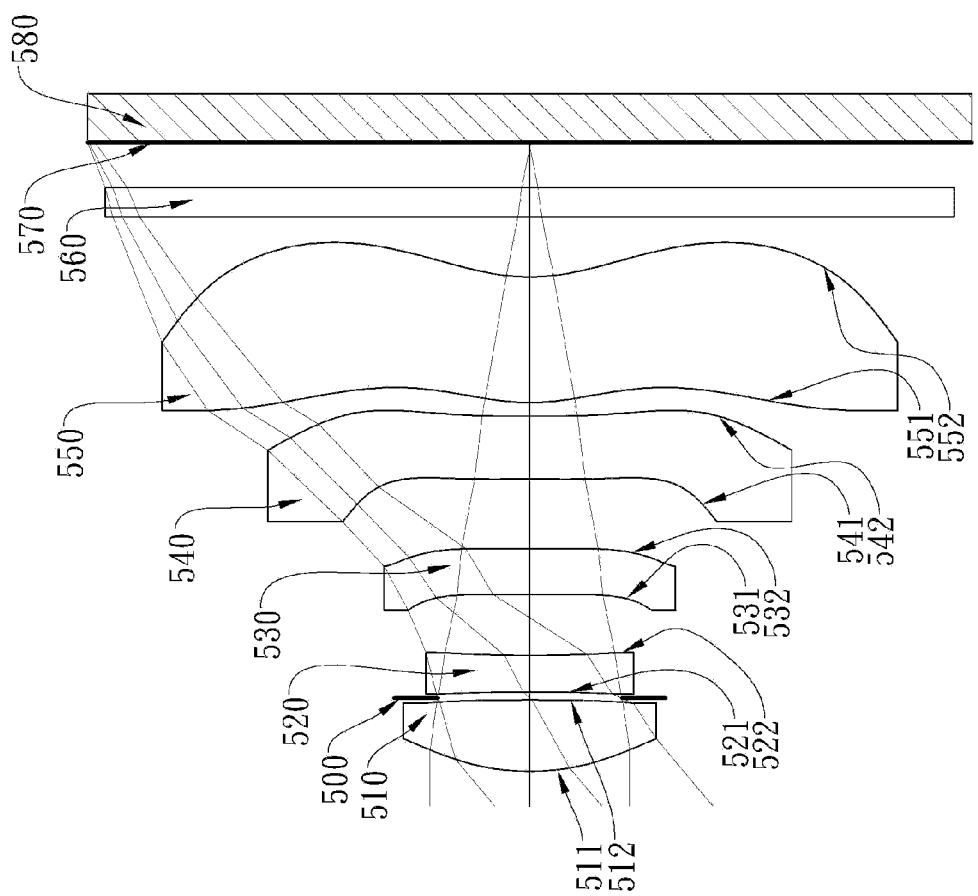
FIG. 5A is a schematic view of an imaging device according to the 5th embodiment of the present disclosure.
Figure 5B:
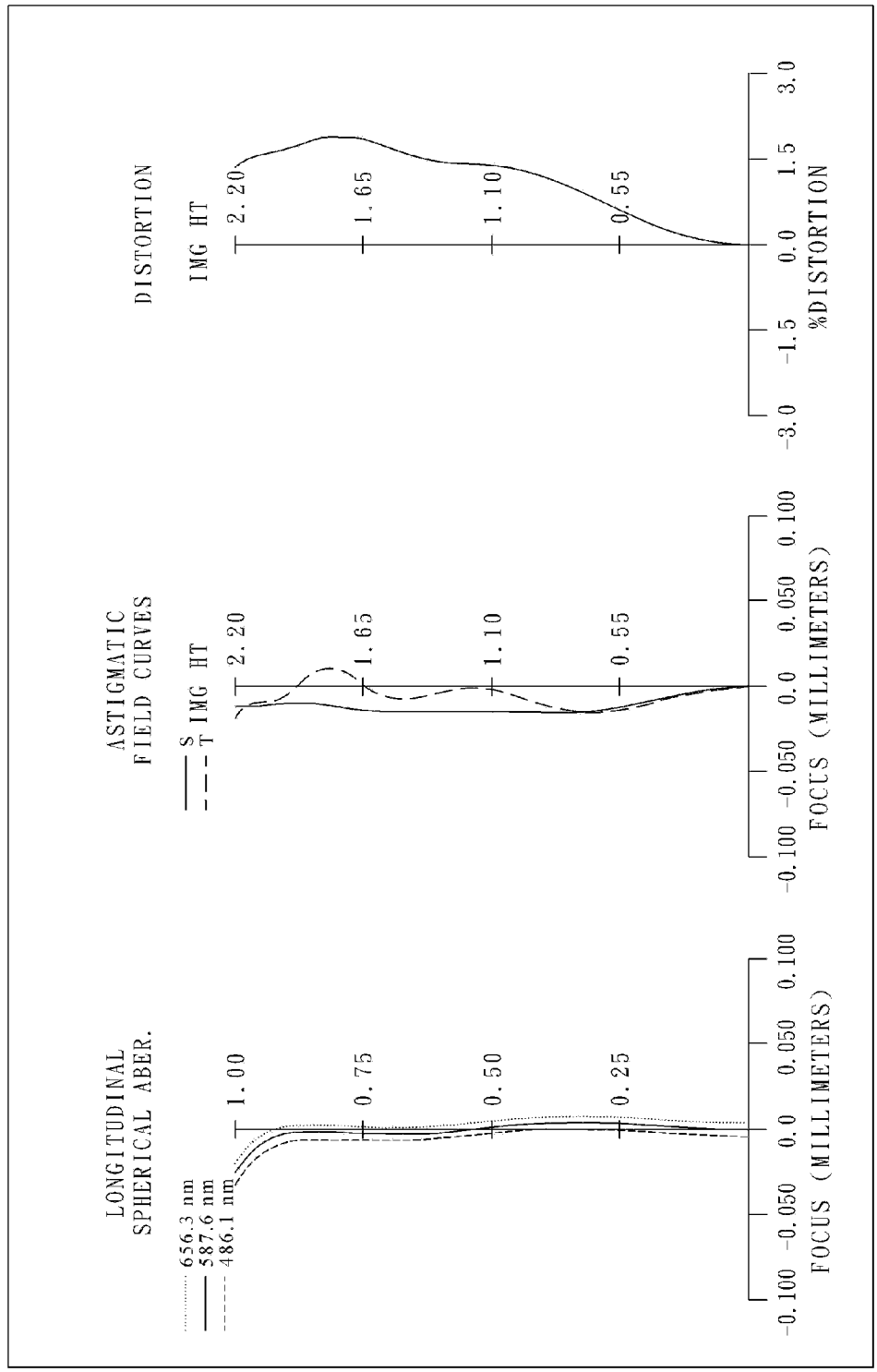
FIG. 5B shows spherical aberration curves, astigmatic field curves and a distortion curve of the imaging device according to the 5th embodiment.

FIG. 5A is a schematic view of an imaging device according to the 5th embodiment of the present disclosure. FIG. 5B shows, in order from left to right, spherical aberration curves, astigmatic field curves and a distortion curve of the imaging device according to the 5th embodiment.

In FIG. 5A, the imaging device includes the imaging optical lens system (not otherwise herein labeled) of the present disclosure and an image sensor 580. The imaging optical lens system includes, in order from an object side to an image side, a first lens element 510, an aperture stop 500, a second lens element 520, a third lens element 530, a fourth lens element 540, a fifth lens element 550, an IR-cut filter 560 and an image plane 570, wherein the imaging optical lens system has a total of five lens elements (510-550) with refractive power.

The first lens element 510 with positive refractive power has an object-side surface 511 being convex in a paraxial region thereof and an image-side surface 512 being convex in a paraxial region thereof, and is made of plastic material. The object-side surface 511 and the image-side surface 512 of the first lens element 510 are aspheric.

The second lens element 520 with negative refractive power has an object-side surface 521 being concave in a paraxial region thereof and an image-side surface 522 being concave in a paraxial region thereof, and is made of plastic material. The object-side surface 521 and the image-side surface 522 of the second lens element 520 are aspheric.

The third lens element 530 with positive refractive power has an object-side surface 531 being convex in a paraxial region thereof and an image-side surface 532 being concave in a paraxial region thereof, and is made of plastic material. The object-side surface 531 and the image-side surface 532 of the third lens element 530 are aspheric.

The fourth lens element 540 with negative refractive power has an object-side surface 541 being concave in a paraxial region thereof and an image-side surface 542 being concave in a paraxial region thereof, and is made of plastic material. The object-side surface 541 and the image-side surface 542 of the fourth lens element 540 are aspheric. Furthermore, both of the object-side surface 541 and the image-side surface 542 of the fourth lens element 540 have at least one inflection point.

The fifth lens element 550 with positive refractive power has an object-side surface 551 being convex in a paraxial region thereof and an image-side surface 552 being concave in a paraxial region thereof, and is made of plastic material. The object-side surface 551 and the image-side surface 552 of the fifth lens element 550 are aspheric. Furthermore, both of the object-side surface 551 and the image-side surface 552 of the fifth lens element 550 have at least one inflection point, wherein the object-side surface 551 of the fifth lens element 550 is convex in a paraxial region thereof and changes to a concave shape and then a convex shape from the paraxial region to a peripheral region.

The IR-cut filter 560 is made of glass and located between the fifth lens element 550 and the image plane 570, and will not affect the focal length of the imaging optical lens system. The image sensor 580 is disposed on the image plane 570 of the imaging optical lens system.

The detailed optical data of the 5th embodiment are shown in Table 9 and the aspheric surface data are shown in Table 10 below.

TABLE 9

5th Embodiment
f = 2.59 mm, Fno = 2.60, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.144 | ASP | 0.356 | Plastic | 1.535 | 55.7 | 2.04 |
| 2 | | −20.185 | ASP | 0.010 | | | | |
| 3 | Ape. Stop | Plano | | 0.030 | | | | |
| 4 | Lens 2 | −11.373 | ASP | 0.182 | Plastic | 1.650 | 21.4 | −5.67 |
| 5 | | 5.482 | ASP | 0.304 | | | | |
| 6 | Lens 3 | 9.494 | ASP | 0.229 | Plastic | 1.632 | 23.4 | 48.85 |
| 7 | | 13.582 | ASP | 0.348 | | | | |
| 8 | Lens 4 | −11.955 | ASP | 0.313 | Plastic | 1.650 | 21.4 | −9.42 |
| 9 | | 12.670 | ASP | 0.070 | | | | |
| 10 | Lens 5 | 1.136 | ASP | 0.626 | Plastic | 1.535 | 55.7 | 48.28 |
| 11 | | 0.961 | ASP | 0.300 | | | | |
| 12 | IR-cut filter | Plano | | 0.145 | Glass | 1.517 | 64.2 | — |
| 13 | | Plano | | 0.226 | | | | |
| 14 | Image | Plano | | — | | | | |

Note:
Reference wavelength is 587.6 nm (d-line).

TABLE 10

Aspheric Coefficients

| Surface # | 1 | 2 | 4 | 5 | 6 |
|---|---|---|---|---|---|
| k = | −1.7840E−01 | −1.0000E+00 | −2.6095E+01 | −2.9962E+01 | 3.4972E+00 |
| A4 = | −6.5246E−02 | −1.7686E−01 | −1.5792E−01 | −1.1491E−01 | −4.6839E−01 |
| A6 = | 2.3462E−01 | −1.2539E−01 | 6.6867E−01 | 4.0119E−01 | −5.1654E−01 |
| A8 = | −2.3789E+00 | 6.0328E+00 | 3.6742E+00 | −1.0500E+00 | −2.7106E+00 |
| A10 = | 6.5919E+00 | −3.0979E+01 | −3.0436E+01 | −2.4418E+00 | 3.4931E+01 |
| A12 = | −9.5708E+00 | 5.4433E+01 | 6.5309E+01 | 5.5013E−03 | −1.6471E+02 |
| A14 = | 2.3255E+00 | −2.4238E+01 | −2.6534E+01 | 9.4131E+00 | 3.1777E+02 |
| A16 = | | | | | −2.2422E+02 |

| Surface # | 7 | 8 | 9 | 10 | 11 |
|---|---|---|---|---|---|
| k = | −2.9633E+01 | 3.3974E+00 | −1.0000E+00 | −1.4665E+00 | −3.3207E+00 |
| A4 = | −3.2948E−01 | 7.5347E−01 | 2.9253E−01 | −8.9979E−01 | −3.9570E−01 |
| A6 = | −9.7686E−02 | −2.8708E+00 | −7.8990E−01 | 9.6687E−01 | 4.1633E−01 |
| A8 = | −5.3370E+00 | 5.0689E+00 | 8.1057E−01 | −6.4906E−01 | −3.5025E−01 |
| A10 = | 3.2349E+01 | −6.6029E+00 | −6.4099E−01 | 2.8481E−01 | 1.9217E−01 |
| A12 = | −8.5117E+01 | 4.7740E+00 | 3.8498E−01 | −7.7726E−02 | −6.2639E−02 |
| A14 = | 1.0488E+02 | −1.8942E+00 | −1.3263E−01 | 1.1889E−02 | 1.0799E−02 |
| A16 = | −4.4499E+01 | 5.3768E−01 | 1.8376E−02 | −7.7820E−04 | −7.5355E−04 |

In the imaging optical lens system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following conditions:

| 5th Embodiment | | | |
|---|---|---|---|
| f [mm] | 2.59 | f/R8 | 0.20 |
| Fno | 2.60 | |f/f2| | 0.46 |
| HFOV [deg.] | 40.0 | f/f4 | −0.27 |
| V2/V4 | 1.00 | f4/f5 | −0.20 |
| CT3/T23 | 0.75 | |f/f3| + |f/f5| | 0.11 |
| CT5/CT4 | 2.00 | TD/(2*SD52) | 0.67 |
| (T12 + T45)/(T23 + T34) | 0.17 | TL/ImgH | 1.43 |
| R10/R6 | 0.07 | | |

6th Embodiment

Figure 6A:
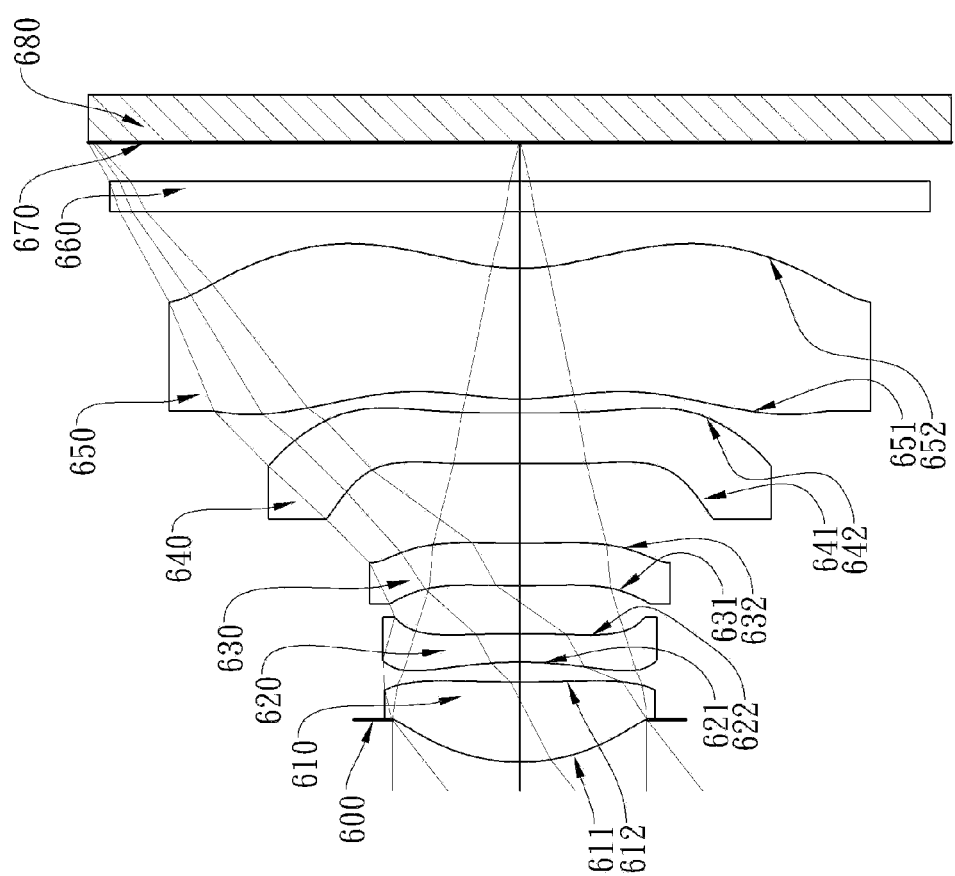
FIG. 6A is a schematic view of an imaging device according to the 6th embodiment of the present disclosure.
Figure 6B:
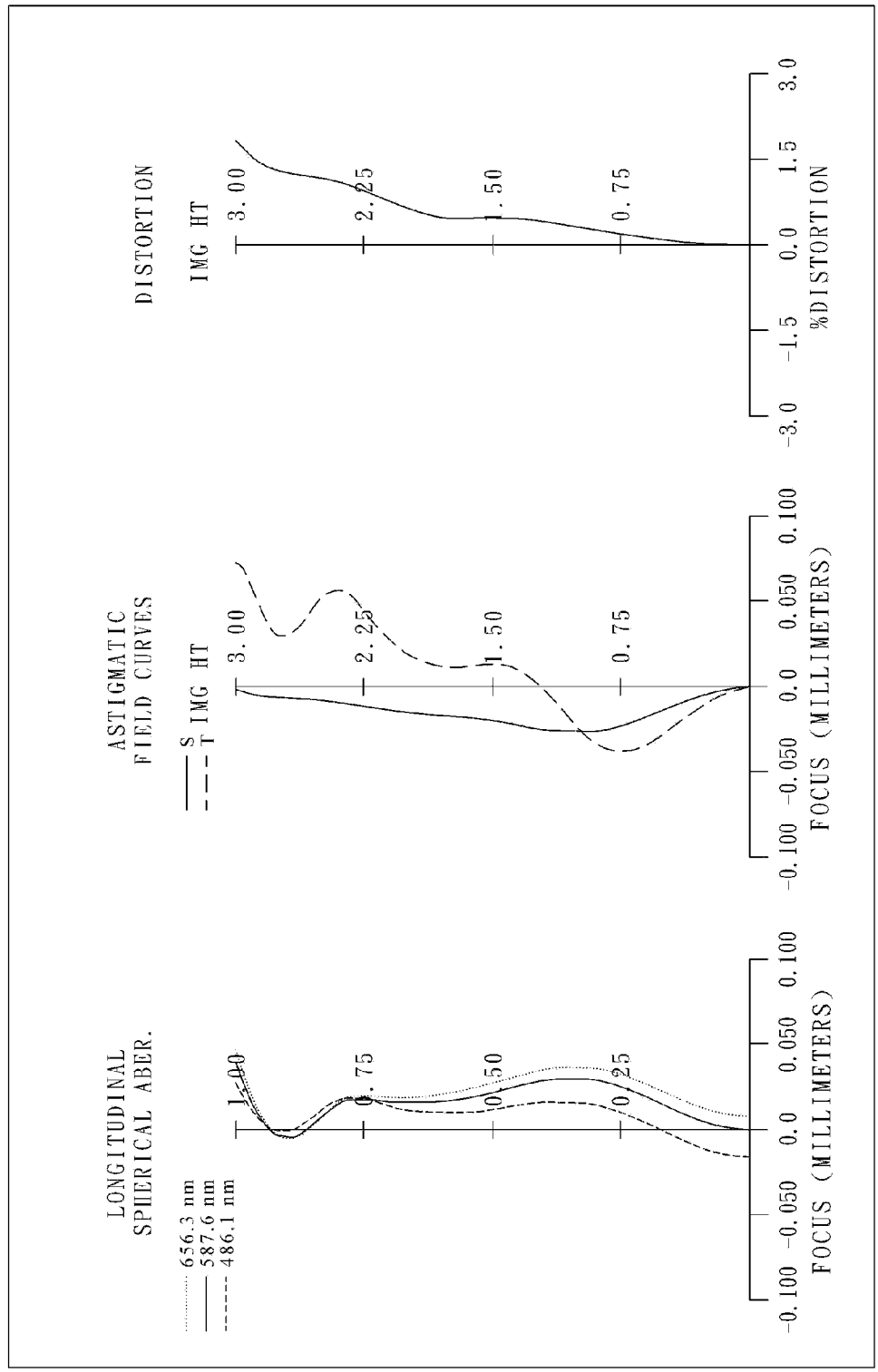
FIG. 6B shows spherical aberration curves, astigmatic field curves and a distortion curve of the imaging device according to the 6th embodiment.

FIG. 6A is a schematic view of an imaging device according to the 6th embodiment of the present disclosure. FIG. 6B shows, in order from left to right, spherical aberration curves, astigmatic field curves and a distortion curve of the imaging device according to the 6th embodiment.

In FIG. 6A, the imaging device includes the imaging optical lens system (not otherwise herein labeled) of the present disclosure and an image sensor 680. The imaging optical lens system includes, in order from an object side to an image side, an aperture stop 600, a first lens element 610, a second lens element 620, a third lens element 630, a fourth lens element 640, a fifth lens element 650, an IR-cut filter 660, and an image plane 670, wherein the imaging optical lens system has a total of five lens elements (610-650) with refractive power.

The first lens element 610 with positive refractive power has an object-side surface 611 being convex in a paraxial region thereof and an image-side surface 612 being concave in a paraxial region thereof, and is made of plastic material. The object-side surface 611 and the image-side surface 612 of the first lens element 610 are aspheric.

The second lens element 620 with negative refractive power has an object-side surface 621 being concave in a paraxial region thereof and an image-side surface 622 being convex in a paraxial region thereof, and is made of plastic material. The object-side surface 621 and the image-side surface 622 of the second lens element 620 are aspheric.

The third lens element 630 with positive refractive power has an object-side surface 631 being convex in a paraxial region thereof and an image-side surface 632 being concave in a paraxial region thereof, and is made of plastic material. The object-side surface 631 and the image-side surface 632 of the third lens element 630 are aspheric.

The fourth lens element 640 with negative refractive power has an object-side surface 641 being concave in a paraxial region thereof and an image-side surface 642 being concave in a paraxial region thereof, and is made of plastic material. The object-side surface 641 and the image-side surface 642 of the fourth lens element 640 are aspheric. Furthermore, both of the object-side surface 641 and the image-side surface 642 of the fourth lens element 640 have at least one inflection point.

The fifth lens element 650 with negative refractive power has an object-side surface 651 being convex in a paraxial region thereof and an image-side surface 652 being concave in a paraxial region thereof, and is made of plastic material. The object-side surface 651 and the image-side surface 652 of the fifth lens element 650 are aspheric. Furthermore, both of the object-side surface 651 and the image-side surface 652 of the fifth lens element 650 have at least one inflection point, wherein the object-side surface 651 of the fifth lens element 650 is convex in a paraxial region thereof and changes to a concave shape and then a convex shape from the paraxial region to a peripheral region.

The IR-cut filter 660 is made of glass and located in order between the fifth lens element 650 and the image plane 670, and will not affect the focal length of the imaging optical lens system. The image sensor 680 is disposed on the image plane 670 of the imaging optical lens system.

The detailed optical data of the 6th embodiment are shown in Table 11 and the aspheric surface data are shown in Table 12 below.

TABLE 11

6th Embodiment
f = 3.76 mm, Fno = 2.10, HFOV = 37.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.297 | | | | |
| 2 | Lens 1 | 1.332 | ASP | 0.562 | Plastic | 1.544 | 55.9 | 2.81 |
| 3 | | 8.792 | ASP | 0.140 | | | | |
| 4 | Lens 2 | −3.038 | ASP | 0.200 | Plastic | 1.632 | 23.4 | −7.63 |
| 5 | | −8.429 | ASP | 0.337 | | | | |
| 6 | Lens 3 | 7.400 | ASP | 0.298 | Plastic | 1.640 | 23.3 | 46.01 |
| 7 | | 9.729 | ASP | 0.560 | | | | |
| 8 | Lens 4 | −12.056 | ASP | 0.355 | Plastic | 1.632 | 23.4 | −13.69 |
| 9 | | 31.023 | ASP | 0.100 | | | | |
| 10 | Lens 5 | 2.009 | ASP | 0.917 | Plastic | 1.544 | 55.9 | −27.62 |
| 11 | | 1.487 | ASP | 0.400 | | | | |
| 12 | IR-cut filter | Plano | | 0.210 | Glass | 1.517 | 64.2 | — |
| 13 | | Plano | | 0.274 | | | | |
| 14 | Image | Plano | | — | | | | |

Note:
Reference wavelength is 587.6 nm (d-line).

TABLE 12

Aspheric Coefficients

| Surface # | 2 | 3 | 4 | 5 | 6 |
|---|---|---|---|---|---|
| k = | −1.1418E−03 | −1.0000E+00 | −1.4956E+01 | −2.3704E+01 | −3.0000E+01 |
| A4 = | −3.0285E−02 | −4.3728E−02 | −4.6482E−02 | 3.4873E−02 | −2.1418E−01 |
| A6 = | 1.2421E−01 | −3.4680E−01 | 8.3154E−02 | 2.5819E−01 | −2.2812E−01 |
| A8 = | −3.7320E−01 | 1.1496E+00 | 6.9764E−01 | 6.6608E−03 | −1.0228E−01 |
| A10 = | 5.1006E−01 | −2.1985E+00 | −1.8239E+00 | 5.1780E−02 | 3.1619E+00 |
| A12 = | −4.1335E−01 | 2.0141E+00 | 2.0208E+00 | −3.7951E−01 | −8.9927E+00 |
| A14 = | 4.1498E−02 | −7.1908E−01 | −7.5267E−01 | 5.3072E−01 | 1.0256E+01 |
| A16 = | | | | | −4.1666E+00 |

| Surface # | 7 | 8 | 9 | 10 | 11 |
|---|---|---|---|---|---|
| k = | −3.0000E+01 | 9.3298E−01 | −1.0000E+00 | −1.6714E+00 | −4.1055E+00 |
| A4 = | −1.6868E−01 | 3.6295E−01 | 1.4248E−01 | −3.8408E−01 | −1.6930E−01 |
| A6 = | −9.5857E−03 | −7.3926E−01 | −2.0075E−01 | 2.5401E−01 | 1.0709E−01 |
| A8 = | −8.4282E−01 | 7.8023E−01 | 1.1847E−01 | −1.0117E−01 | −5.4100E−02 |
| A10 = | 2.9916E+00 | −5.9882E−01 | −5.8052E−02 | 2.6080E−02 | 1.7629E−02 |
| A12 = | −4.5466E+00 | 2.6367E−01 | 2.0900E−02 | −4.1747E−03 | −3.3697E−03 |
| A14 = | 3.3032E+00 | −6.1544E−02 | −4.1911E−03 | 3.7685E−04 | 3.4166E−04 |
| A16 = | −9.0443E−01 | 6.9680E−03 | 3.3448E−04 | −1.4739E−05 | −1.4087E−05 |

In the imaging optical lens system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f [mm] | 3.76 | f/R8 | 0.12 |
| Fno | 2.10 | |f/f2| | 0.49 |
| HFOV [deg.] | 37.9 | f/f4 | −0.27 |
| V2/V4 | 1.00 | f4/f5 | 0.50 |
| CT3/T23 | 0.88 | |f/f3| + |f/f5| | 0.22 |
| CT5/CT4 | 2.58 | TD/(2*SD52) | 0.70 |
| (T12 + T45)/(T23 + T34) | 0.27 | TL/ImgH | 1.45 |
| R10/R6 | 0.15 | | |

7th Embodiment

Figure 7A:
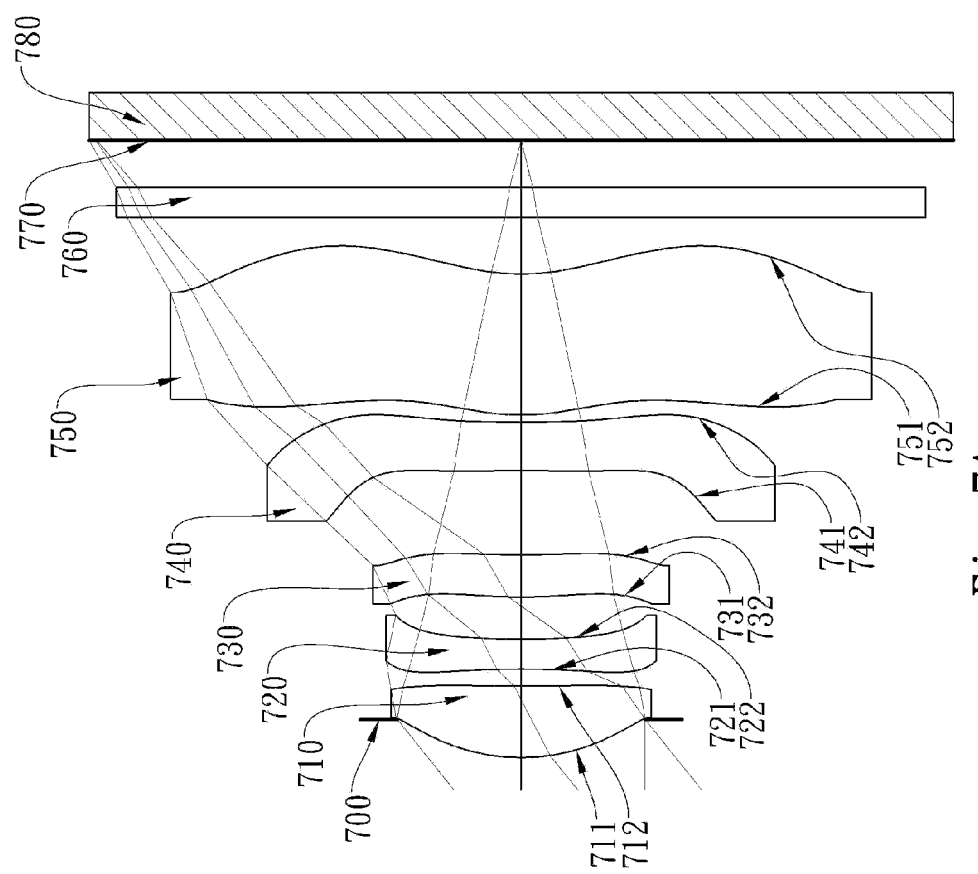
FIG. 7A is a schematic view of an imaging device according to the 7th embodiment of the present disclosure.
Figure 7B:
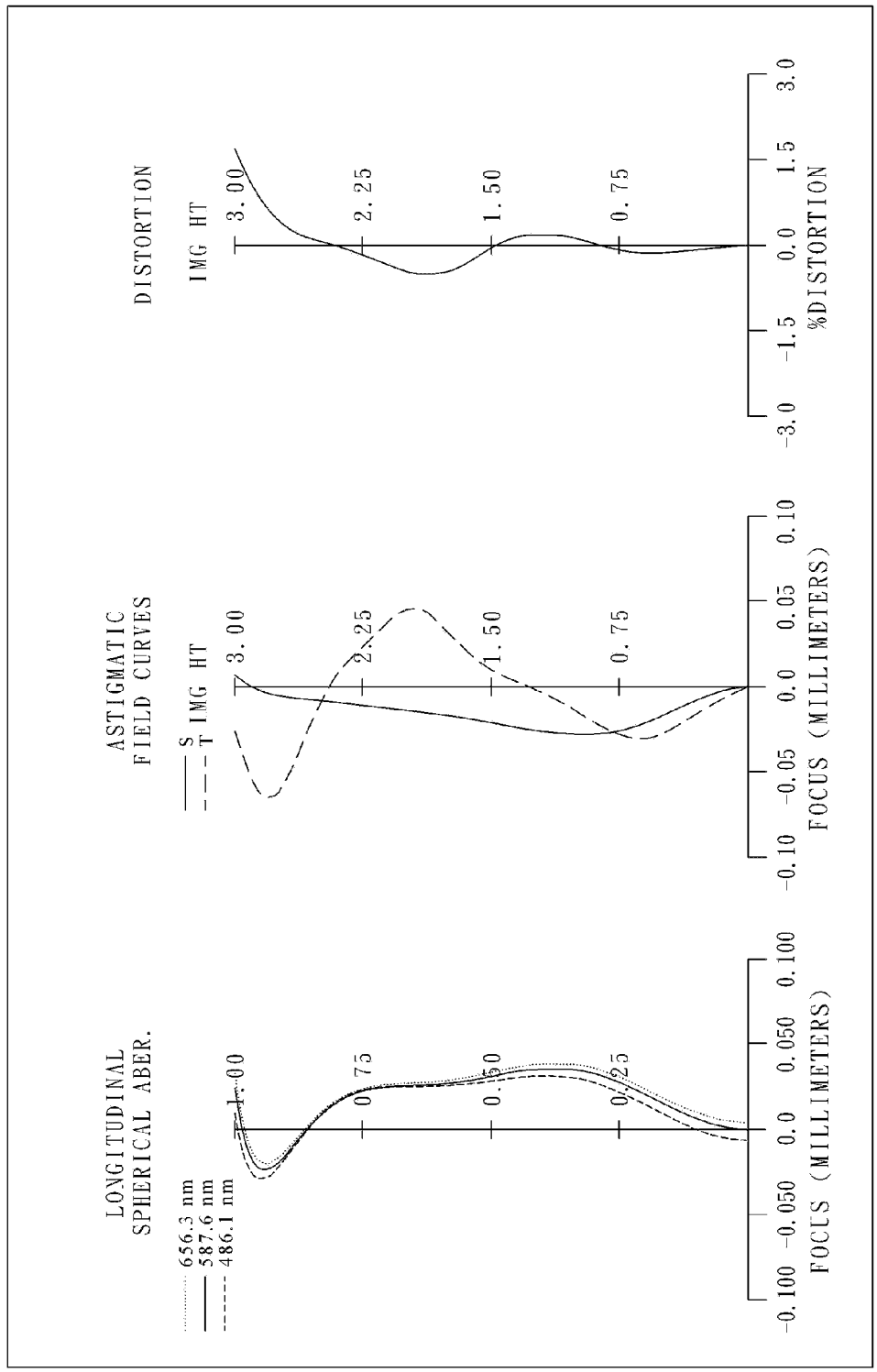
FIG. 7B shows spherical aberration curves, astigmatic field curves and a distortion curve of the imaging device according to the 7th embodiment.

FIG. 7A is a schematic view of an imaging device according to the 7th embodiment of the present disclosure. FIG. 7B shows, in order from left to right, spherical aberration curves, astigmatic field curves and a distortion curve of the imaging device according to the 7th embodiment.

In FIG. 7A, the imaging device includes the imaging optical lens system (not otherwise herein labeled) of the present disclosure and an image sensor 780. The imaging optical lens system includes, in order from an object side to an image side, an aperture stop 700, a first lens element 710, a second lens element 720, a third lens element 730, a fourth lens element 740, a fifth lens element 750, an IR-cut filter 760 and an image plane 770, wherein the imaging optical lens system has a total of five lens elements (710-750) with refractive power.

The first lens element 710 with positive refractive power has an object-side surface 711 being convex in a paraxial region thereof and an image-side surface 712 being concave in a paraxial region thereof, and is made of plastic material. The object-side surface 711 and the image-side surface 712 of the first lens element 710 are aspheric.

The second lens element 720 with negative refractive power has an object-side surface 721 being concave in a paraxial region thereof and an image-side surface 722 being concave in a paraxial region thereof, and is made of plastic material. The object-side surface 721 and the image-side surface 722 of the second lens element 720 are aspheric.

The third lens element 730 with positive refractive power has an object-side surface 731 being convex in a paraxial region thereof and an image-side surface 732 being concave in a paraxial region thereof, and is made of plastic material. The object-side surface 731 and the image-side surface 732 of the third lens element 730 are aspheric.

The fourth lens element 740 with negative refractive power has an object-side surface 741 being concave in a paraxial region thereof and an image-side surface 742 being concave in a paraxial region thereof, and is made of plastic material. The object-side surface 741 and the image-side surface 742 of the fourth lens element 740 are aspheric. Furthermore, both of the object-side surface 741 and the image-side surface 742 of the fourth lens element 740 have at least one inflection point.

The fifth lens element 750 with positive refractive power has an object-side surface 751 being convex in a paraxial region thereof and an image-side surface 752 being concave in a paraxial region thereof, and is made of plastic material. The object-side surface 751 and the image-side surface 752 of the fifth lens element 750 are aspheric. Furthermore, both of the object-side surface 751 and the image-side surface 752 of the fifth lens element 750 have at least one inflection point, wherein the object-side surface 751 of the fifth lens element 750 is convex in a paraxial region thereof and changes to a concave shape and then a convex shape from the paraxial region to a peripheral region.

The IR-cut filter 760 is made of glass and located in order between the fifth lens element 750 and the image plane 770, and will not affect the focal length of the imaging optical lens system. The image sensor 780 is disposed on the image plane 770 of the imaging optical lens system.

The detailed optical data of the 7th embodiment are shown in Table 13 and the aspheric surface data are shown in Table 14 below.

TABLE 13

7th Embodiment
f = 3.67 mm, Fno = 2.10, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.270 | | | | |
| 2 | Lens 1 | 1.390 | ASP | 0.504 | Plastic | 1.544 | 55.9 | 2.75 |
| 3 | | 16.807 | ASP | 0.119 | | | | |
| 4 | Lens 2 | −7.641 | ASP | 0.211 | Plastic | 1.632 | 23.4 | −4.87 |
| 5 | | 5.208 | ASP | 0.298 | | | | |
| 6 | Lens 3 | 3.494 | ASP | 0.298 | Plastic | 1.607 | 26.6 | 11.70 |
| 7 | | 6.654 | ASP | 0.595 | | | | |
| 8 | Lens 4 | −5.828 | ASP | 0.341 | Plastic | 1.632 | 23.4 | −6.66 |
| 9 | | 15.523 | ASP | 0.050 | | | | |
| 10 | Lens 5 | 1.509 | ASP | 0.995 | Plastic | 1.544 | 55.9 | 11.78 |
| 11 | | 1.515 | ASP | 0.400 | | | | |
| 12 | IR-cut filter | Plano | | 0.210 | Glass | 1.517 | 64.2 | — |
| 13 | | Plano | | 0.333 | | | | |
| 14 | Image | Plano | | — | | | | |

Note:
Reference wavelength is 587.6 nm (d-line).

TABLE 14

Aspheric Coefficients

| Surface # | 2 | 3 | 4 | 5 | 6 |
|---|---|---|---|---|---|
| k = | 1.1628E−02 | −1.0000E+00 | −1.3246E+01 | −3.0000E+01 | −5.5124E−01 |
| A4 = | −2.8889E−02 | −3.0238E−02 | −4.9490E−02 | −2.3407E−02 | −1.9597E−01 |
| A6 = | 1.1835E−01 | −2.9631E−02 | 8.3107E−02 | 2.4462E−01 | −1.9694E−01 |
| A8 = | −3.8046E−01 | 1.1598E+00 | 7.0936E−01 | −1.2686E−02 | −8.8463E−02 |
| A10 = | 4.8521E−01 | −2.2118E+00 | −1.8373E+00 | 4.8880E−02 | 3.1190E+00 |
| A12 = | −3.8541E−01 | 1.9851E+00 | 2.0226E+00 | −4.1231E−01 | −9.0502E+00 |
| A14 = | 7.8857E−02 | −6.8082E−01 | −7.6155E−01 | 4.9115E−01 | 1.0300E+01 |
| A16 = | | | | | −4.1666E+00 |

| Surface # | 7 | 8 | 9 | 10 | 11 |
|---|---|---|---|---|---|
| k = | 5.0000E+00 | −2.9568E+01 | −1.0000E+00 | −1.3349E+00 | −2.4765E+00 |
| A4 = | −1.2376E−01 | 4.0402E−01 | 1.3164E−01 | −3.9047E−01 | −1.8196E−01 |
| A6 = | −1.4439E−02 | −7.6778E−01 | −1.8651E−01 | 2.5319E−01 | 1.0912E−01 |
| A8 = | −8.5592E−01 | 7.9119E−01 | 1.1563E−01 | −1.0116E−01 | −5.4256E−02 |
| A10 = | 2.9880E+00 | −5.9476E−01 | −5.8206E−02 | 2.6094E−02 | 1.7630E−02 |
| A12 = | −4.5461E+00 | 2.6342E−01 | 2.0940E−02 | −4.1728E−03 | −3.3647E−03 |
| A14 = | 3.3046E+00 | −6.1983E−02 | −4.1852E−03 | 3.7669E−04 | 3.4089E−04 |
| A16 = | −9.0365E−01 | 6.6830E−03 | 3.3242E−04 | −1.4734E−05 | −1.4052E−05 |

In the imaging optical lens system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following conditions:

| 7th Embodiment | | | |
|---|---|---|---|
| f [mm] | 3.67 | f/R8 | 0.24 |
| Fno | 2.10 | \|f/f2\| | 0.75 |
| HFOV [deg.] | 38.7 | f/f4 | −0.55 |
| V2/V4 | 1.00 | f4/f5 | −0.57 |
| CT3/T23 | 1.00 | \|f/f3\| + \|f/f5\| | 0.62 |
| CT5/CT4 | 2.92 | TD/(2*SD52) | 0.69 |
| (T12 + T45)/(T23 + T34) | 0.19 | TL/ImgH | 1.45 |
| R10/R6 | 0.23 | | |

8th Embodiment

Figure 8A:
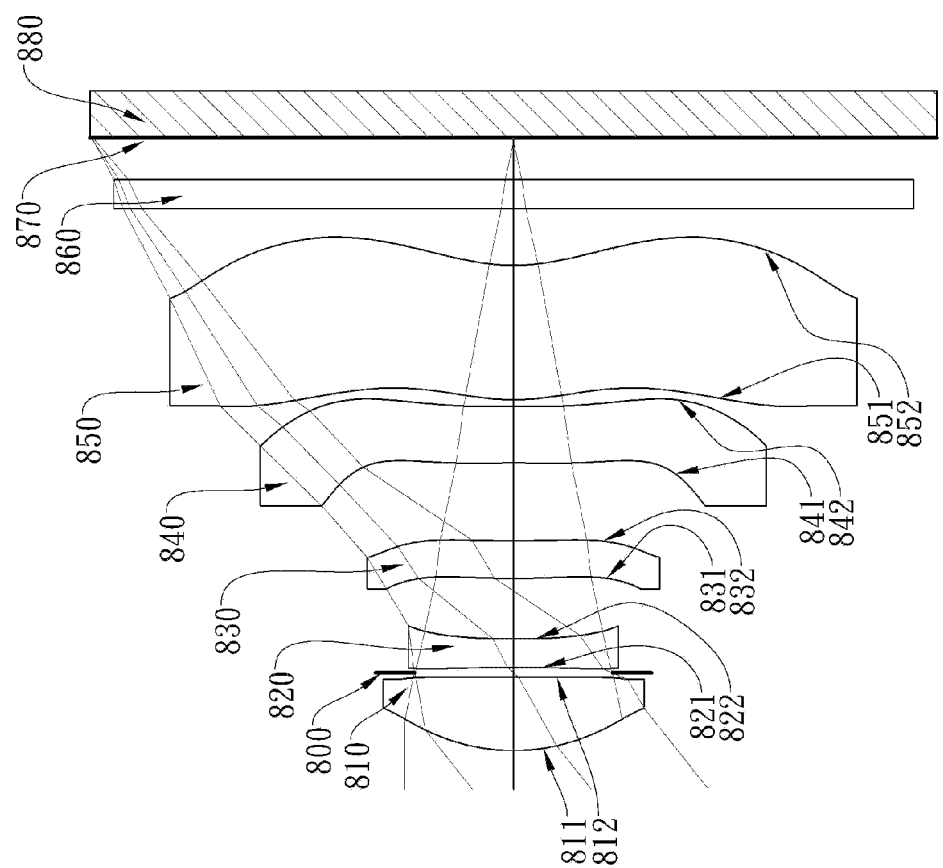
FIG. 8A is a schematic view of an imaging device according to the 8th embodiment of the present disclosure.
Figure 8B:
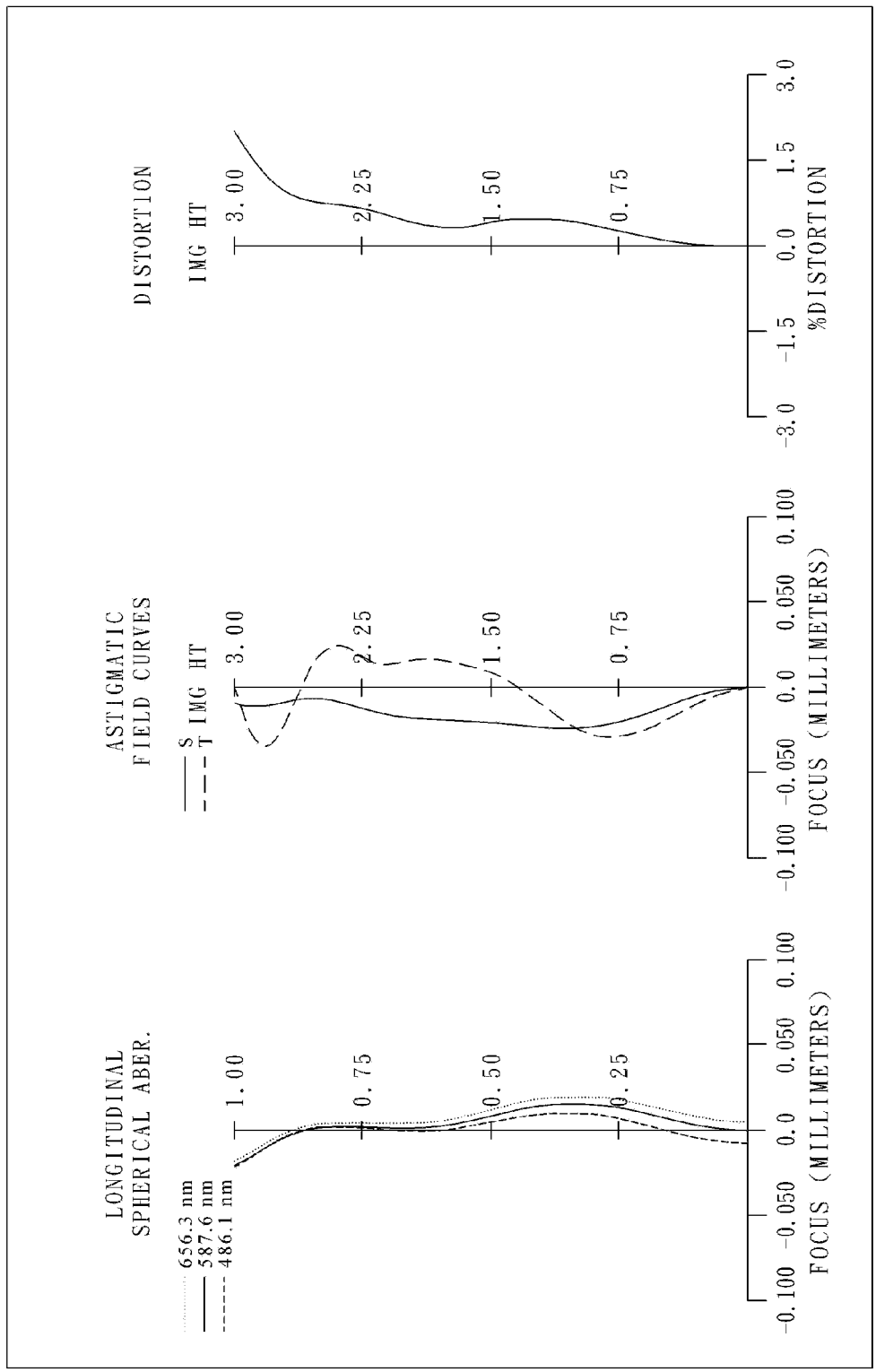
FIG. 8B shows spherical aberration curves, astigmatic field curves and a distortion curve of the imaging device according to the 8th embodiment.

FIG. 8A is a schematic view of an imaging device according to the 8th embodiment of the present disclosure. FIG. 8B shows, in order from left to right, spherical aberration curves, astigmatic field curves and a distortion curve of the imaging device according to the 8th embodiment.

In FIG. 8A, the imaging device includes the imaging optical lens system (not otherwise herein labeled) of the present disclosure and an image sensor 880. The imaging optical lens system includes, in order from an object side to an image side, a first lens element 810, an aperture stop 800, a second lens element 820, a third lens element 830, a fourth lens element 840, a fifth lens element 850, an IR-cut filter 860 and an image plane 870, wherein the imaging optical lens system has a total of five lens elements (810-850) with refractive power.

The first lens element 810 with positive refractive power has an object-side surface 811 being convex in a paraxial region thereof and an image-side surface 812 being concave in a paraxial region thereof, and is made of plastic material. The object-side surface 811 and the image-side surface 812 of the first lens element 810 are aspheric.

The second lens element 820 with negative refractive power has an object-side surface 821 being concave in a paraxial region thereof and an image-side surface 822 being concave in a paraxial region thereof, and is made of plastic material. The object-side surface 821 and the image-side surface 822 of the second lens element 820 are aspheric.

The third lens element 830 with positive refractive power has an object-side surface 831 being convex in a paraxial region thereof and an image-side surface 832 being concave in a paraxial region thereof, and is made of plastic material. The object-side surface 831 and the image-side surface 832 of the third lens element 830 are aspheric.

The fourth lens element 840 with negative refractive power has an object-side surface 841 being concave in a paraxial region thereof and an image-side surface 842 being concave in a paraxial region thereof, and is made of plastic material. The object-side surface 841 and the image-side surface 842 of the fourth lens element 840 are aspheric. Furthermore, both of the object-side surface 841 and the image-side surface 842 of the fourth lens element 840 have at least one inflection point.

The fifth lens element 850 with positive refractive power has an object-side surface 851 being convex in a paraxial region thereof and an image-side surface 852 being concave in a paraxial region thereof, and is made of plastic material. The object-side surface 851 and the image-side surface 852 of the fifth lens element 850 are aspheric. Furthermore, both of the object-side surface 851 and the image-side surface 852 of the fifth lens element 850 have at least one inflection point, wherein the object-side surface 851 of the fifth lens element 850 is convex in a paraxial region thereof and changes to a concave shape and then a convex shape from the paraxial region to a peripheral region.

The IR-cut filter 860 is made of glass and located between the fifth lens element 850 and the image plane 870, and will not affect the focal length of the imaging optical lens system. The image sensor 880 is disposed on the image plane 870 of the imaging optical lens system.

The detailed optical data of the 8th embodiment are shown in Table 15 and the aspheric surface data are shown in Table 16 below.

TABLE 15

8th Embodiment
f = 3.70 mm, Fno = 2.40, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.391 | ASP | 0.521 | Plastic | 1.544 | 55.9 | 2.71 |
| 2 | | 20.933 | ASP | 0.032 | | | | |
| 3 | Ape. Stop | Plano | | 0.037 | | | | |
| 4 | Lens 2 | −16.187 | ASP | 0.202 | Plastic | 1.639 | 23.5 | −5.73 |
| 5 | | 4.751 | ASP | 0.431 | | | | |
| 6 | Lens 3 | 5.313 | ASP | 0.267 | Plastic | 1.607 | 26.6 | 28.28 |
| 7 | | 7.547 | ASP | 0.553 | | | | |
| 8 | Lens 4 | −10.560 | ASP | 0.400 | Plastic | 1.632 | 23.4 | −9.82 |
| 9 | | 15.261 | ASP | 0.050 | | | | |
| 10 | Lens 5 | 1.611 | ASP | 0.956 | Plastic | 1.544 | 55.9 | 28.35 |
| 11 | | 1.423 | ASP | 0.400 | | | | |
| 12 | IR-cut filter | Plano | | 0.210 | Glass | 1.517 | 64.2 | — |
| 13 | | Plano | | 0.296 | | | | |
| 14 | Image | Plano | | — | | | | |

Note:
Reference wavelength is 587.6 nm (d-line).

TABLE 16

Aspheric Coefficients

| Surface # | 1 | 2 | 4 | 5 | 6 |
|---|---|---|---|---|---|
| k = | 5.9134E−02 | −1.0000E+00 | −1.7363E+01 | 5.0000E+00 | 4.1156E+00 |
| A4 = | −2.3601E−02 | −5.8920E−02 | −5.5000E−02 | 5.4103E−03 | −1.6703E−01 |
| A6 = | 1.0175E−01 | −2.3133E−01 | 1.0160E−01 | 2.1092E−01 | −2.2713E−01 |
| A8 = | −3.8078E−01 | 1.1755E+00 | 7.1023E−01 | −2.8395E−02 | −9.9135E−02 |
| A10 = | 5.2200E−01 | −2.2818E+00 | −1.8645E+00 | 3.2726E−02 | 3.1783E+00 |
| A12 = | −3.4662E−01 | 1.9300E+00 | 1.8799E+00 | −4.3682E−01 | −9.0221E+00 |
| A14 = | −3.9034E−03 | −6.5437E−01 | −6.8877E−01 | 5.0594E−01 | 1.0195E+01 |
| A16 = | | | | | −4.1666E+00 |

| Surface # | 7 | 8 | 9 | 10 | 11 |
|---|---|---|---|---|---|
| k = | 2.8907E+00 | 5.0000E+00 | −1.0000E+00 | −1.4582E+00 | −3.1690E+00 |
| A4 = | −1.4054E−01 | 3.9170E−01 | 1.3410E−01 | −3.9409E−01 | −1.7822E−01 |
| A6 = | −1.4953E−02 | −7.5113E−01 | −1.8473E−01 | 2.5338E−01 | 1.1037E−01 |
| A8 = | −8.4188E−01 | 7.9092E−01 | 1.1464E−01 | −1.0107E−01 | −5.4601E−02 |
| A10 = | 2.9826E+00 | −5.9565E−01 | −5.8350E−02 | 2.6105E−02 | 1.7621E−02 |
| A12 = | −4.5562E+00 | 2.6294E−01 | 2.0971E−02 | −4.1735E−03 | −3.3660E−03 |
| A14 = | 3.2984E+00 | −6.2139E−02 | −4.1776E−03 | 3.7651E−04 | 3.4152E−04 |
| A16 = | −9.0163E−01 | 6.6570E−03 | 3.3625E−04 | −1.4766E−05 | −1.4059E−05 |

In the imaging optical lens system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following conditions:

| 8th Embodiment | | | |
|---|---|---|---|
| f [mm] | 3.70 | f/R8 | 0.24 |
| Fno | 2.40 | |f/f2| | 0.65 |
| HFOV [deg.] | 38.5 | f/f4 | −0.38 |
| V2/V4 | 1.00 | f4/f5 | −0.35 |
| CT3/T23 | 0.62 | |f/f3| + |f/f5| | 0.26 |
| CT5/CT4 | 2.39 | TD/(2*SD52) | 0.71 |
| (T12 + T45)/(T23 + T34) | 0.12 | TL/ImgH | 1.45 |
| R10/R6 | 0.19 | | |

9th Embodiment

Figure 9A:
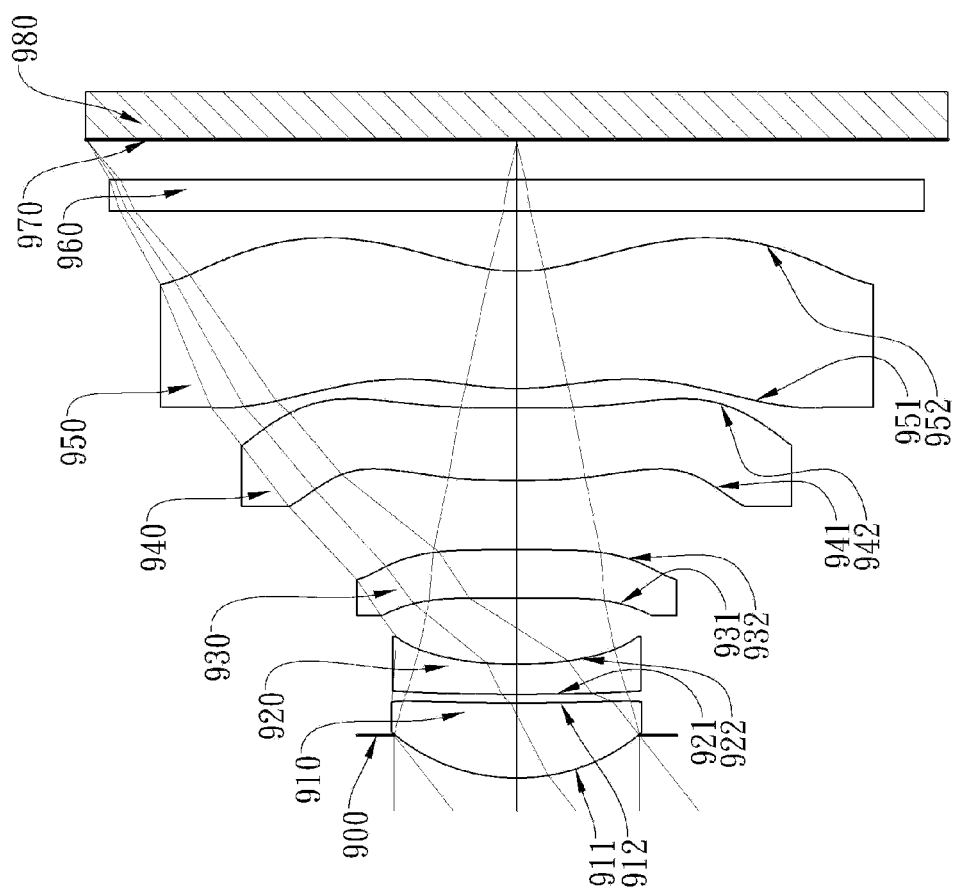
FIG. 9A is a schematic view of an imaging device according to the 9th embodiment of the present disclosure.
Figure 9B:
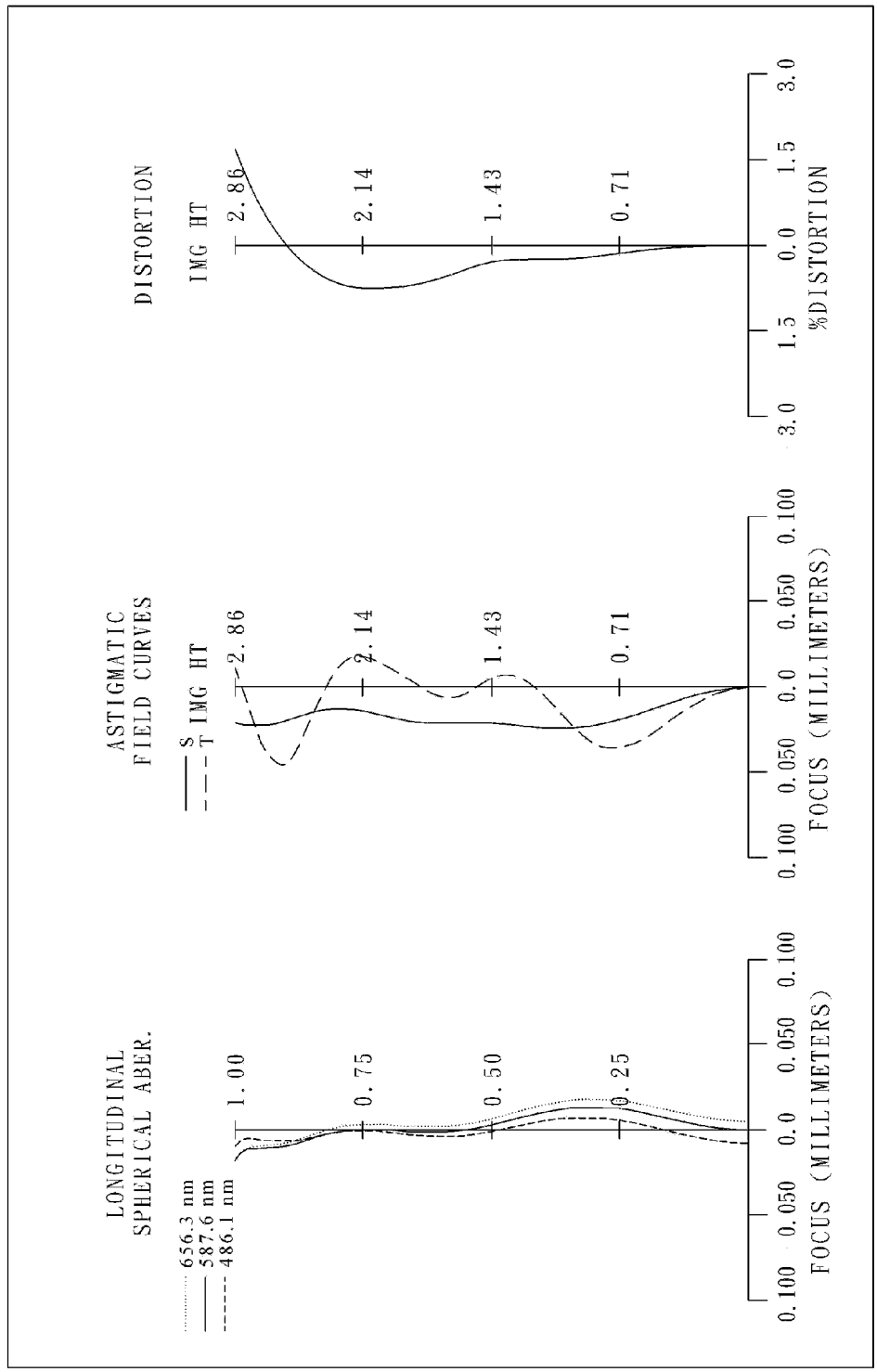
FIG. 9B shows spherical aberration curves, astigmatic field curves and a distortion curve of the imaging device according to the 9th embodiment.

FIG. 9A is a schematic view of an imaging device according to the 9th embodiment of the present disclosure. FIG. 9B shows, in order from left to right, spherical aberration curves, astigmatic field curves and a distortion curve of the imaging device according to the 9th embodiment.

In FIG. 9A, the imaging device includes the imaging optical lens system (not otherwise herein labeled) of the present disclosure and an image sensor 980. The imaging optical lens system includes, in order from an object side to an image side, an aperture stop 900, a first lens element 910, a second lens element 920, a third lens element 930, a fourth lens element 940, a fifth lens element 950, an IR-cut filter 960 and an image plane 970, wherein the imaging optical lens system has a total of five lens elements (910-950) with refractive power.

The first lens element 910 with positive refractive power has an object-side surface 911 being convex in a paraxial region thereof and an image-side surface 912 being concave in a paraxial region thereof, and is made of plastic material. The object-side surface 911 and the image-side surface 912 of the first lens element 910 are aspheric.

The second lens element 920 with negative refractive power has an object-side surface 921 being convex in a paraxial region thereof and an image-side surface 922 being concave in a paraxial region thereof, and is made of plastic material. The object-side surface 921 and the image-side surface 922 of the second lens element 920 are aspheric.

The third lens element 930 with positive refractive power has an object-side surface 931 being convex in a paraxial region thereof and an image-side surface 932 being concave in a paraxial region thereof, and is made of plastic material. The object-side surface 931 and the image-side surface 932 of the third lens element 930 are aspheric.

The fourth lens element 940 with positive refractive power has an object-side surface 941 being convex in a paraxial region thereof and an image-side surface 942 being concave in a paraxial region thereof, and is made of plastic material. The object-side surface 941 and the image-side surface 942 of the fourth lens element 940 are aspheric. Furthermore, both of the object-side surface 941 and the image-side surface 942 of the fourth lens element 940 have at least one inflection point.

The fifth lens element 950 with negative refractive power has an object-side surface 951 being convex in a paraxial region thereof and an image-side surface 952 being concave in a paraxial region thereof, and is made of plastic material. The object-side surface 951 and the image-side surface 952 of the fifth lens element 950 are aspheric. Furthermore, both of the object-side surface 951 and the image-side surface 952 of the fifth lens element 950 have at least one inflection point, wherein the object-side surface 951 of the fifth lens element 950 is convex in a paraxial region thereof and changes to a concave shape and then a convex shape from the paraxial region to a peripheral region.

The IR-cut filter 960 is made of glass and located between the fifth lens element 950 and the image plane 970, and will not affect the focal length of the imaging optical lens system. The image sensor 980 is disposed on the image plane 970 of the imaging optical lens system.

The detailed optical data of the 9th embodiment are shown in Table 17 and the aspheric surface data are shown in Table 18 below.

TABLE 17

9th Embodiment
f = 3.59 mm, Fno = 2.20, HFOV = 38.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.283 | | | | |
| 2 | Lens 1 | 1.309 | ASP | 0.499 | Plastic | 1.543 | 56.5 | 2.63 |
| 3 | | 13.624 | ASP | 0.057 | | | | |
| 4 | Lens 2 | 11.877 | ASP | 0.200 | Plastic | 1.639 | 23.5 | −4.89 |
| 5 | | 2.458 | ASP | 0.439 | | | | |
| 6 | Lens 3 | 17.666 | ASP | 0.321 | Plastic | 1.543 | 56.5 | 44.16 |
| 7 | | 66.553 | ASP | 0.463 | | | | |
| 8 | Lens 4 | 9.220 | ASP | 0.482 | Plastic | 1.543 | 56.5 | 23.95 |
| 9 | | 31.023 | ASP | 0.130 | | | | |
| 10 | Lens 5 | 1.829 | ASP | 0.780 | Plastic | 1.535 | 55.7 | −9.97 |
| 11 | | 1.159 | ASP | 0.400 | | | | |
| 12 | IR-cut filter | Plano | | 0.210 | Glass | 1.517 | 64.2 | — |
| 13 | | Plano | | 0.266 | | | | |
| 14 | Image | Plano | | — | | | | |

Note:
Reference wavelength is 587.6 nm (d-line).

TABLE 18

Aspheric Coefficients

| Surface # | 2 | 3 | 4 | 5 | 6 |
|---|---|---|---|---|---|
| k = | 1.0326E−01 | −1.0000E+00 | −2.9871E+01 | −5.7016E+00 | −2.9475E+01 |
| A4 = | −1.2596E−02 | −3.8565E−02 | −1.0704E−01 | 1.8888E−02 | −1.7826E−01 |
| A6 = | 1.3045E−01 | −1.6302E−01 | 1.2686E−01 | 2.2849E−01 | −1.7585E−01 |
| A8 = | −4.0347E−01 | 1.1726E+00 | 7.3452E−01 | 2.4296E−03 | −1.8990E−01 |
| A10 = | 5.7896E−01 | −2.4398E+00 | −2.0235E+00 | −3.1513E−02 | 3.2006E+00 |
| A12 = | −2.4633E−01 | 2.0984E+00 | 1.7430E+00 | −4.4074E−01 | −8.8834E+00 |
| A14 = | −1.1079E−01 | −7.6606E−01 | −4.7771E−01 | 7.1968E−01 | 1.0135E+01 |
| A16 = | | | | | −4.1666E+00 |

| Surface # | 7 | 8 | 9 | 10 | 11 |
|---|---|---|---|---|---|
| k = | −1.0000E+00 | −1.0000E+00 | −1.0000E+00 | −1.1533E+00 | −4.4655E+00 |
| A4 = | −1.5665E−01 | 3.1818E−01 | 1.5550E−01 | −4.0010E−01 | −1.6513E−01 |
| A6 = | −3.1134E−02 | −6.8550E−01 | −1.8486E−01 | 2.5334E−01 | 1.0858E−01 |
| A8 = | −8.1771E−01 | 7.7158E−01 | 1.1344E−01 | −1.0087E−01 | −5.4899E−02 |
| A10 = | 2.9803E+00 | −5.9404E−01 | −5.9042E−02 | 2.6127E−02 | 1.7648E−02 |
| A12 = | −4.5556E+00 | 2.6623E−01 | 2.1119E−02 | −4.1752E−03 | −3.3489E−03 |
| A14 = | 3.3077E+00 | −6.0931E−02 | −4.1353E−03 | 3.7449E−04 | 3.4147E−04 |
| A16 = | −9.0858E−01 | 5.5365E−03 | 3.3115E−04 | −1.4544E−05 | −1.4322E−05 |

In the imaging optical lens system according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following conditions:

| 9th Embodiment | | | |
|---|---|---|---|
| f [mm] | 3.59 | f/R8 | 0.12 |
| Fno | 2.20 | |f/f2| | 0.73 |
| HFOV [deg.] | 38.1 | f/f4 | 0.15 |
| V2/V4 | 0.42 | f4/f5 | −2.40 |
| CT3/T23 | 0.73 | |f/f3| + |f/f5| | 0.44 |
| CT5/CT4 | 1.62 | TD/(2*SD52) | 0.71 |
| (T12 + T45)/(T23 + T34) | 0.21 | TL/ImgH | 1.49 |
| R10/R6 | 0.02 | | |

10th Embodiment

Figure 10A:
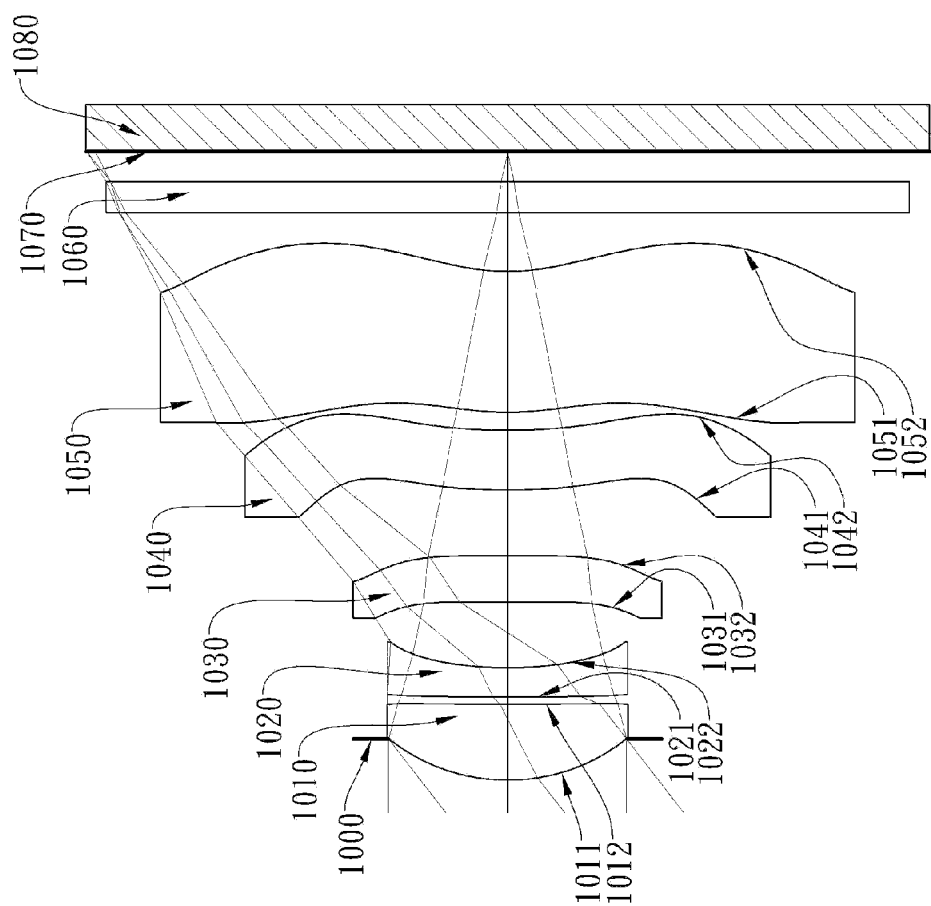
FIG. 10A is a schematic view of an imaging device according to the 10th embodiment of the present disclosure.
Figure 10B:
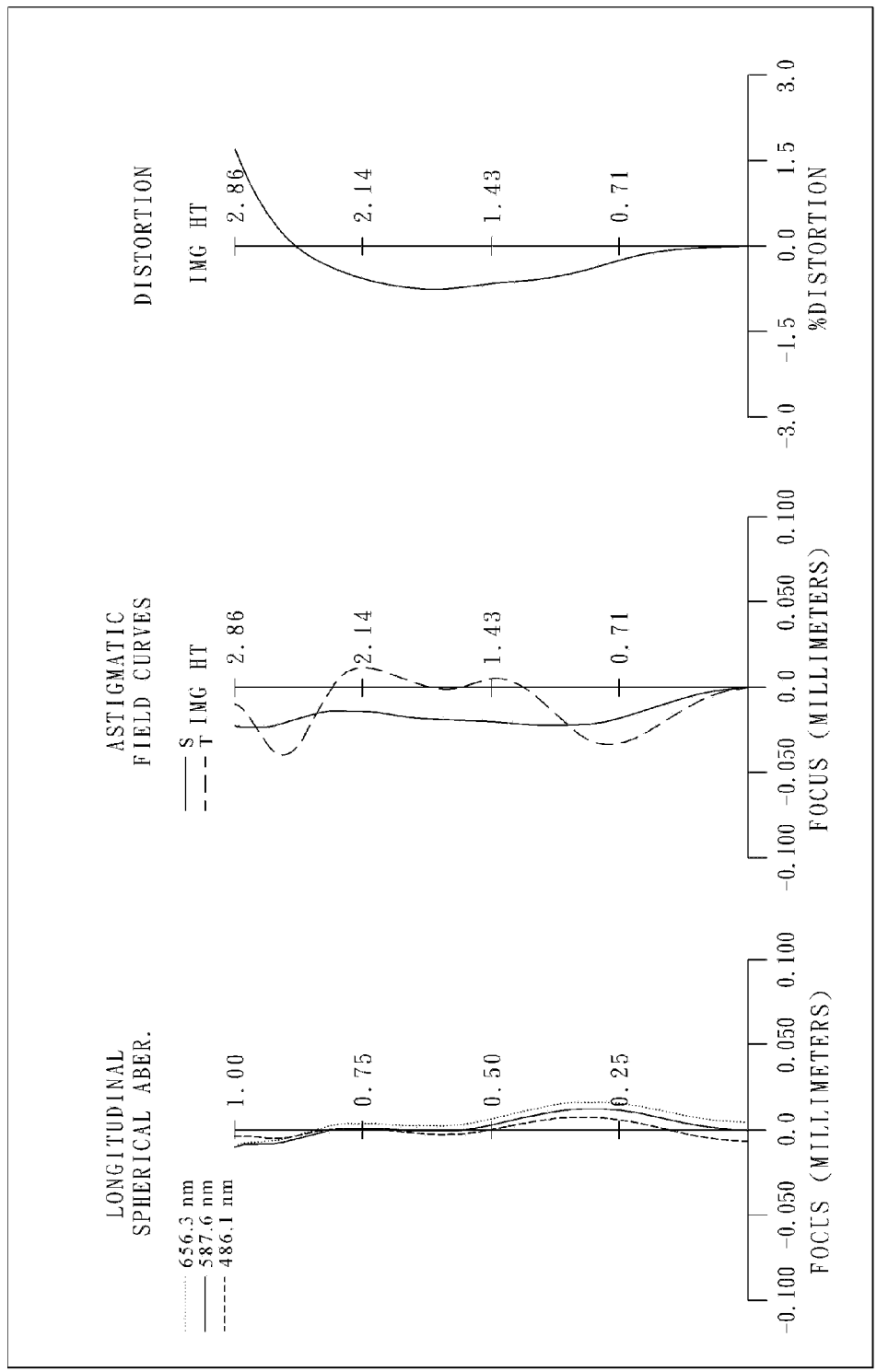
FIG. 10B shows spherical aberration curves, astigmatic field curves and a distortion curve of the imaging device according to the 10th embodiment.

FIG. 10A is a schematic view of an imaging device according to the 10th embodiment of the present disclosure. FIG. 10B shows, in order from left to right, spherical aberration curves, astigmatic field curves and a distortion curve of the imaging device according to the 10th embodiment.

In FIG. 10A, the imaging device includes the imaging optical lens system (not otherwise herein labeled) of the present disclosure and an image sensor 1080. The imaging optical lens system includes, in order from an object side to an image side, an aperture stop 1000, a first lens element 1010, a second lens element 1020, a third lens element 1030, a fourth lens element 1040, a fifth lens element 1050, an IR-cut filter 1060 and an image plane 1070, wherein the imaging optical lens system has a total of five lens elements (1010-1050) with refractive power.

The first lens element 1010 with positive refractive power has an object-side surface 1011 being convex in a paraxial region thereof and an image-side surface 1012 being concave in a paraxial region thereof, and is made of plastic material.

The object-side surface 1011 and the image-side surface 1012 of the first lens element 1010 are aspheric.

The second lens element 1020 with negative refractive power has an object-side surface 1021 being convex in a paraxial region thereof and an image-side surface 1022 being concave in a paraxial region thereof, and is made of plastic material. The object-side surface 1021 and the image-side surface 1022 of the second lens element 1020 are aspheric.

The third lens element 1030 with positive refractive power has an object-side surface 1031 being convex in a paraxial region thereof and an image-side surface 1032 being concave in a paraxial region thereof, and is made of plastic material. The object-side surface 1031 and the image-side surface 1032 of the third lens element 1030 are aspheric.

The fourth lens element 1040 with negative refractive power has an object-side surface 1041 being convex in a paraxial region thereof and an image-side surface 1042 being concave in a paraxial region thereof, and is made of plastic material. The object-side surface 1041 and the image-side surface 1042 of the fourth lens element 1040 are aspheric. Furthermore, both of the object-side surface 1041 and the image-side surface 1042 of the fourth lens element 1040 have at least one inflection point.

The fifth lens element 1050 with negative refractive power has an object-side surface 1051 being convex in a paraxial region thereof and an image-side surface 1052 being concave in a paraxial region thereof, and is made of plastic material. The object-side surface 1051 and the image-side surface 1052 of the fifth lens element 1050 are aspheric. Furthermore, both of the object-side surface 1051 and the image-side surface 1052 of the fifth lens element 1050 have at least one inflection point, wherein the object-side surface 1051 of the fifth lens element 1050 is convex in a paraxial region thereof and changes to a concave shape and then a convex shape from the paraxial region to a peripheral region.

The IR-cut filter 1060 is made of glass and located between the fifth lens element 1050 and the image plane 1070, and will not affect the focal length of the imaging optical lens system. The image sensor 1080 is disposed on the image plane 1070 of the imaging optical lens system.

The detailed optical data of the 10th embodiment are shown in Table 19 and the aspheric surface data are shown in Table 20 below.

TABLE 19

10th Embodiment
f = 3.63 mm, Fno = 2.25, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.278 | | | | |
| 2 | Lens 1 | 1.314 | ASP | 0.514 | Plastic | 1.544 | 55.9 | 2.53 |
| 3 | | 25.705 | ASP | 0.048 | | | | |
| 4 | Lens 2 | 15.628 | ASP | 0.200 | Plastic | 1.639 | 23.5 | −4.64 |
| 5 | | 2.480 | ASP | 0.446 | | | | |
| 6 | Lens 3 | 13.499 | ASP | 0.314 | Plastic | 1.530 | 55.8 | 44.73 |
| 7 | | 31.104 | ASP | 0.448 | | | | |
| 8 | Lens 4 | 6.252 | ASP | 0.405 | Plastic | 1.530 | 55.8 | −27.30 |
| 9 | | 4.268 | ASP | 0.122 | | | | |
| 10 | Lens 5 | 1.865 | ASP | 0.956 | Plastic | 1.544 | 55.9 | −34.81 |
| 11 | | 1.391 | ASP | 0.400 | | | | |
| 12 | IR-cut filter | Plano | | 0.210 | Glass | 1.517 | 64.2 | — |
| 13 | | Plano | | 0.205 | | | | |
| 14 | Image | Plano | | — | | | | |

Note:
Reference wavelength is 587.6 nm (d-line).

TABLE 20

Aspheric Coefficients

| Surface # | 2 | 3 | 4 | 5 | 6 |
|---|---|---|---|---|---|
| k = | 1.1642E−01 | −1.0000E+00 | −2.9797E+01 | −6.2612E+00 | −1.8431E+01 |
| A4 = | −1.4044E−02 | −3.5337E−02 | −1.0558E−01 | 1.4503E−02 | −1.7472E−01 |
| A6 = | 1.2828E−01 | −1.4801E−01 | 1.1951E−01 | 2.3218E−01 | −1.7634E−01 |
| A8 = | −4.0184E−01 | 1.1241E+00 | 7.7335E−01 | −2.6046E−02 | −1.8589E−01 |
| A10 = | 5.6647E−01 | −2.3674E+00 | −2.0966E+00 | −5.7589E−02 | 3.1979E+00 |
| A12 = | −2.4428E−01 | 1.9963E+00 | 1.7850E+00 | −2.7838E−01 | −8.8977E+00 |
| A14 = | −1.0845E−01 | −6.6675E−01 | −4.1662E−01 | 6.0278E−01 | 1.0139E+01 |
| A16 = | | | | | −4.1666E+00 |

| Surface # | 7 | 8 | 9 | 10 | 11 |
|---|---|---|---|---|---|
| k = | −1.0000E+00 | −1.0000E+00 | −1.0000E+00 | −8.9508E−01 | −4.1394E+00 |
| A4 = | −1.5774E−01 | 2.9947E−01 | 8.6214E−02 | −3.9527E−01 | −1.6898E−01 |
| A6 = | −2.3956E−02 | −6.9723E−01 | −1.6948E−01 | 2.5256E−01 | 1.0990E−01 |
| A8 = | −8.2036E−01 | 7.7180E−01 | 1.1392E−01 | −1.0098E−01 | −5.4908E−02 |
| A10 = | 2.9812E+00 | −5.9257E−01 | −5.9197E−02 | 2.6127E−02 | 1.7620E−02 |
| A12 = | −4.5519E+00 | 2.6603E−01 | 2.1072E−02 | −4.1766E−03 | −3.3524E−03 |
| A14 = | 3.3065E+00 | −6.0995E−02 | −4.1404E−03 | 3.7493E−04 | 3.4178E−04 |
| A16 = | −9.0885E−01 | 5.5910E−03 | 3.3067E−04 | −1.4541E−05 | −1.4256E−05 |

In the imaging optical lens system according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following conditions:

| 10th Embodiment | | | |
|---|---|---|---|
| f [mm] | 3.63 | f/R8 | 0.85 |
| Fno | 2.25 | |f/f2| | 0.78 |
| HFOV [deg.] | 37.7 | f/f4 | −0.13 |
| V2/V4 | 0.42 | f4/f5 | 0.78 |
| CT3/T23 | 0.70 | |f/f3| + |f/f5| | 0.19 |
| CT5/CT4 | 2.36 | TD/(2*SD52) | 0.73 |
| (T12 + T45)/(T23 + T34) | 0.19 | TL/ImgH | 1.49 |
| R10/R6 | 0.04 | | |

11th Embodiment

Figure 11A:
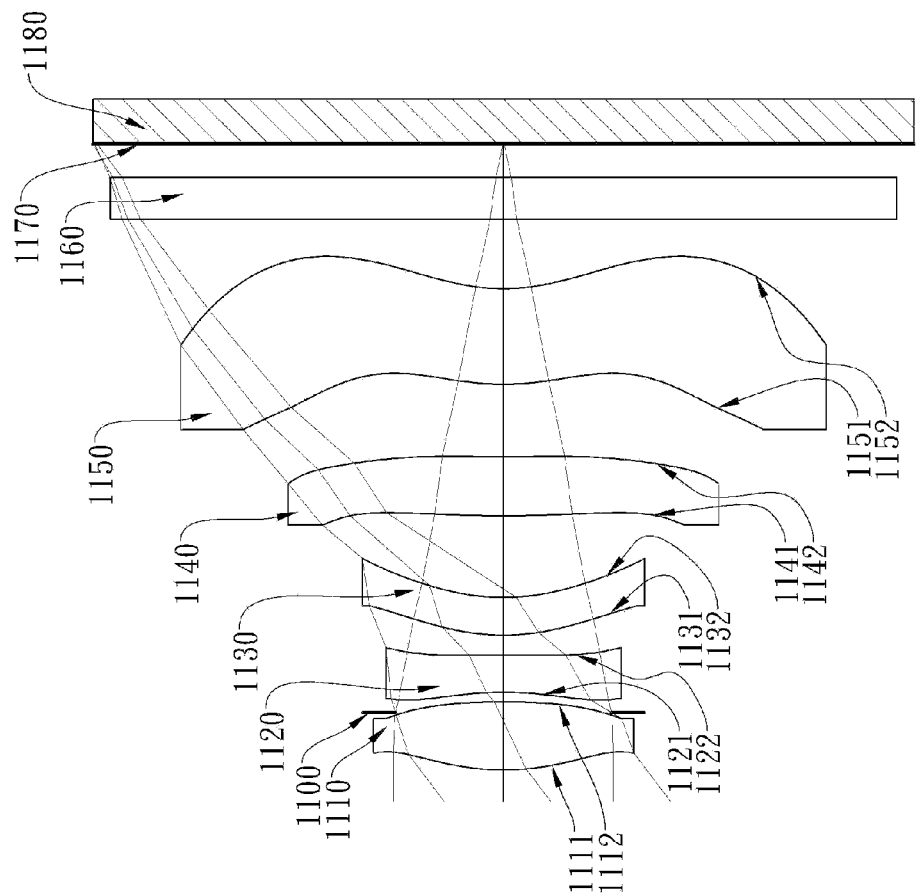
FIG. 11A is a schematic view of an imaging device according to the 11th embodiment of the present disclosure.
Figure 11B:
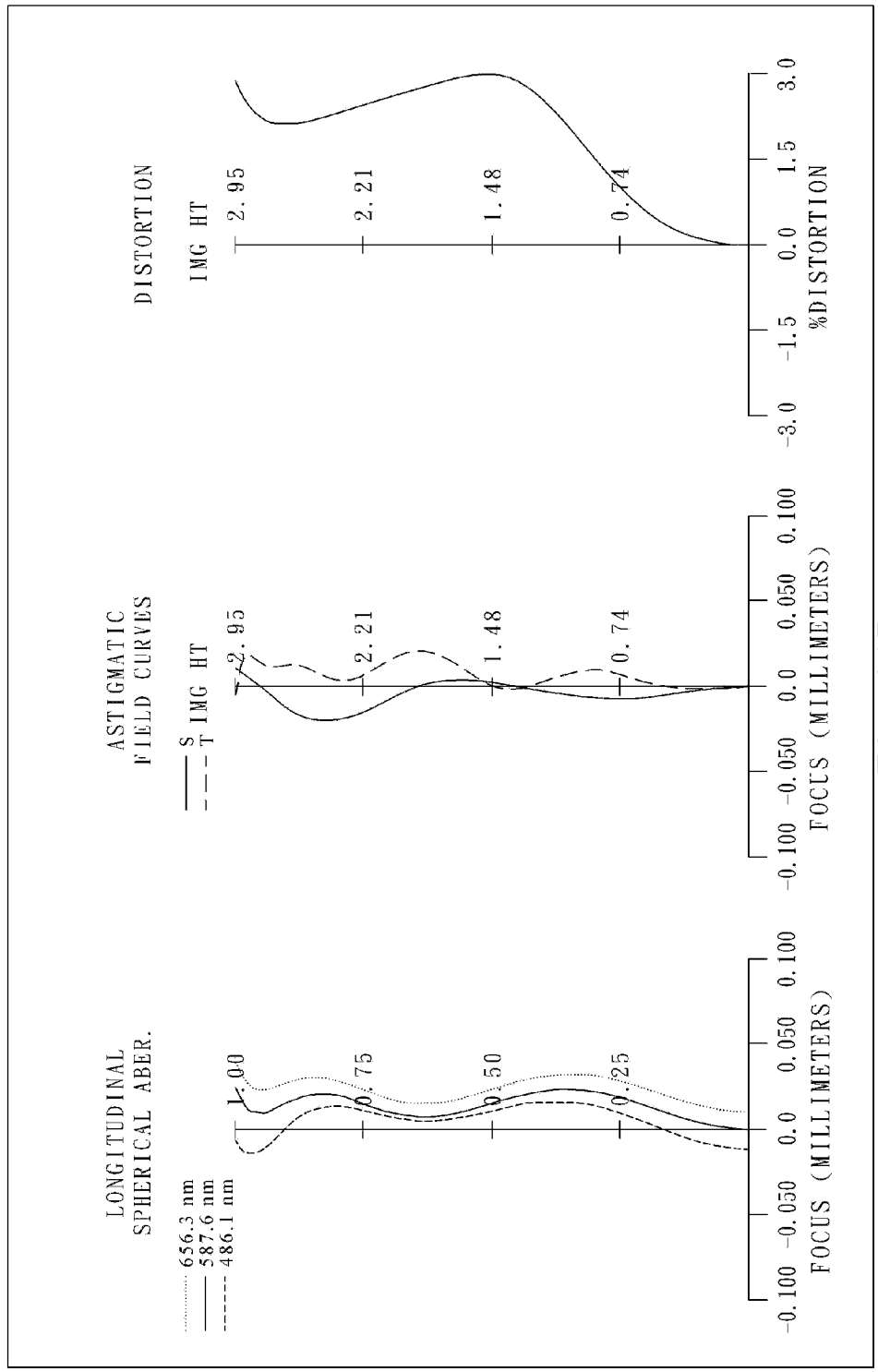
FIG. 11B shows spherical aberration curves, astigmatic field curves and a distortion curve of the imaging device according to the 11th embodiment.
Figure 12:
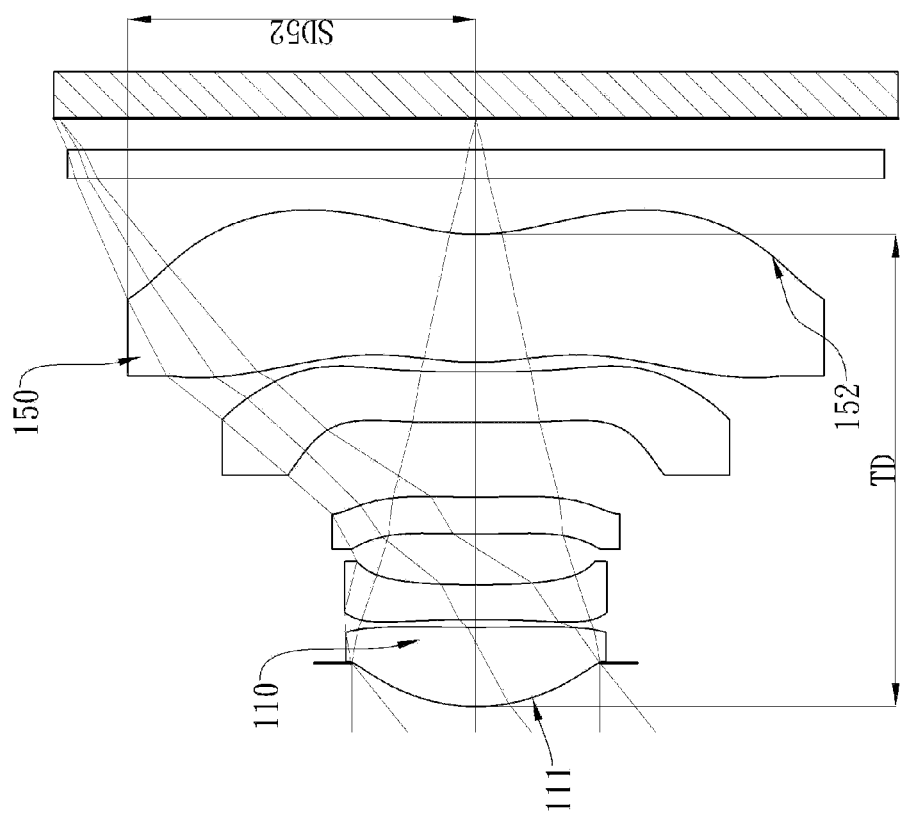
FIG. 12 shows TD and SD52 of the present disclosure according to the FIG. 1A.

FIG. 11A is a schematic view of an imaging device according to the 11th embodiment of the present disclosure. FIG. 11B shows, in order from left to right, spherical aberration curves, astigmatic field curves and a distortion curve of the imaging device according to the 11th embodiment.

In FIG. 11A, the imaging device includes the imaging optical lens system (not otherwise herein labeled) of the present disclosure and an image sensor 1180. The imaging optical lens system includes, in order from an object side to an image side, a first lens element 1110, an aperture stop 1100, a second lens element 1120, a third lens element 1130, a fourth lens element 1140, a fifth lens element 1150, an IR-cut filter 1160 and an image plane 1170, wherein the imaging optical lens system has a total of five lens elements (1110-1150) with refractive power.

The first lens element 1110 with positive refractive power has an object-side surface 1111 being convex in a paraxial region thereof and an image-side surface 1112 being convex in a paraxial region thereof, and is made of glass material. The object-side surface 1111 and the image-side surface 1112 of the first lens element 1110 are aspheric.

The second lens element 1120 with negative refractive power has an object-side surface 1121 being concave in a paraxial region thereof and an image-side surface 1122 being convex in a paraxial region thereof, and is made of plastic material. The object-side surface 1121 and the image-side surface 1122 of the second lens element 1120 are aspheric.

The third lens element 1130 with positive refractive power has an object-side surface 1131 being convex in a paraxial region thereof and an image-side surface 1132 being concave in a paraxial region thereof, and is made of plastic material. The object-side surface 1131 and the image-side surface 1132 of the third lens element 1130 are aspheric.

The fourth lens element 1140 with positive refractive power has an object-side surface 1141 being convex in a paraxial region thereof and an image-side surface 1142 being concave in a paraxial region thereof, and is made of plastic material. The object-side surface 1141 and the image-side surface 1142 of the fourth lens element 1140 are aspheric. Furthermore, both of the object-side surface 1141 and the image-side surface 1142 of the fourth lens element 1140 have at least one inflection point.

The fifth lens element 1150 with negative refractive power has an object-side surface 1151 being convex in a paraxial region thereof and an image-side surface 1152 being concave in a paraxial region thereof, and is made of plastic material. The object-side surface 1151 and the image-side surface 1152 of the fifth lens element 1150 are aspheric. Furthermore, both of the object-side surface 1151 and the image-side surface 1152 of the fifth lens element 1150 have at least one inflection point, wherein the object-side surface 1151 of the fifth lens element 1150 is convex in a paraxial region thereof and changes to a concave shape and then a convex shape from the paraxial region to a peripheral region.

The IR-cut filter 1160 is made of glass and located between the fifth lens element 1150 and the image plane 1170, and will not affect the focal length of the imaging optical lens system. The image sensor 1080 is disposed on the image plane 1170 of the imaging optical lens system.

The detailed optical data of the 11th embodiment are shown in Table 21 and the aspheric surface data are shown in Table 22 below.

TABLE 21

11th Embodiment
f = 3.76 mm, Fno = 2.40, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.782 | ASP | 0.489 | Glass | 1.548 | 45.7 | 2.53 |
| 2 | | −5.687 | ASP | −0.076 | | | | |
| 3 | Ape. Stop | Plano | | 0.146 | | | | |
| 4 | Lens 2 | −2.254 | ASP | 0.265 | Plastic | 1.650 | 21.4 | −4.02 |
| 5 | | −17.240 | ASP | 0.145 | | | | |
| 6 | Lens 3 | 1.479 | ASP | 0.272 | Plastic | 1.650 | 21.4 | 22.44 |
| 7 | | 1.526 | ASP | 0.588 | | | | |
| 8 | Lens 4 | 7.930 | ASP | 0.425 | Plastic | 1.544 | 55.9 | 35.14 |
| 9 | | 13.292 | ASP | 0.522 | | | | |
| 10 | Lens 5 | 1.860 | ASP | 0.687 | Plastic | 1.544 | 55.9 | −20.21 |
| 11 | | 1.384 | ASP | 0.500 | | | | |
| 12 | IR-cut filter | Plano | | 0.300 | Glass | 1.517 | 64.2 | — |
| 13 | | Plano | | 0.240 | | | | |
| 14 | Image | Plano | | — | | | | |

Note:
Reference wavelength is 587.6 nm (d-line).

TABLE 22

| Aspheric Coefficients | | | | | |
|---|---|---|---|---|---|
| Surface # | 1 | 2 | 4 | 5 | 6 |
| k = | −2.9715E+00 | −1.0000E+00 | −1.0416E+01 | 1.0000E+01 | −1.4067E+00 |
| A4 = | −3.7698E−03 | −1.2176E−01 | 1.3986E−01 | 1.9620E−01 | −1.6209E−01 |
| A6 = | −2.5351E−02 | −1.4762E−01 | −1.2238E−01 | −9.4454E−02 | 1.6884E−01 |
| A8 = | −2.2333E−01 | 7.6119E−01 | 4.5795E−01 | 1.8698E−01 | −2.4027E−01 |
| A10 = | 1.3933E−01 | −1.2957E+00 | −4.6177E−01 | −3.5494E−01 | 2.5213E−01 |
| A12 = | −1.8116E−01 | 8.5911E−01 | 1.9351E−01 | 2.1835E−01 | −1.2596E−01 |
| A14 = | 1.6236E−01 | −1.1867E−01 | | | |
| Surface # | 7 | 8 | 9 | 10 | 11 |
| k = | −2.2337E+00 | −1.0000E+00 | 1.0000E+01 | −7.4867E−01 | −1.1910E+00 |
| A4 = | −5.4191E−02 | −5.4528E−02 | −1.4685E−01 | −2.5197E−01 | −1.9585E−01 |
| A6 = | 3.3702E−02 | 3.5980E−02 | 1.0683E−01 | 1.8688E−02 | 6.5425E−02 |
| A8 = | −1.1557E−02 | −5.9411E−02 | −4.0944E−02 | 2.0396E−02 | −1.8482E−02 |
| A10 = | 1.0388E−02 | 6.5311E−02 | 6.9281E−03 | −4.0643E−03 | 3.4962E−03 |
| A12 = | 2.0149E−02 | −4.7776E−02 | 1.0756E−05 | −2.2322E−04 | −3.7876E−04 |
| A14 = | −1.7346E−02 | 1.2861E−02 | −2.5244E−04 | 6.7106E−05 | 1.7237E−05 |

In the imaging optical lens system according to the 11th embodiment, the definitions of these parameters shown in the following table are the same as those stated in the 1st embodiment with corresponding values for the 11th embodiment. Moreover, these parameters can be calculated from Table 21 and Table 22 as the following values and satisfy the following conditions:

| 11th Embodiment | | | |
|---|---|---|---|
| f [mm] | 3.76 | f/R8 | 0.28 |
| Fno | 2.40 | |f/f2| | 0.94 |
| HFOV [deg.] | 37.2 | f/f4 | 0.11 |
| V2/V4 | 0.38 | f4/f5 | −1.74 |
| CT3/T23 | 1.88 | |f/f3| + |f/f5| | 0.35 |
| CT5/CT4 | 1.62 | TD/(2*SD52) | 0.75 |
| (T12 + T45)/(T23 + T34) | 0.81 | TL/ImgH | 1.53 |
| R10/R6 | 0.91 | | |

The foregoing description, for purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens system comprising, in order from an object side to an image side:
a first lens element with positive refractive power having an object-side surface being convex in a paraxial region thereof;
a second lens element having refractive power;
a third lens element with positive refractive power having an object-side surface being convex in a paraxial region thereof and an image-side surface being concave in a paraxial region thereof;
a fourth lens element with refractive power having an image-side surface being concave in a paraxial region thereof; and
a fifth lens element with refractive power having an image-side surface being concave in a paraxial region thereof, wherein both of an object-side surface and the image-side surface of the fifth lens element are aspheric, and at least one of the object-side surface and the image-side surface of the fifth lens element has at least one inflection point;
wherein the imaging optical lens system has a total of five lens elements with refractive power, a focal length of the imaging optical lens system is f, a curvature radius of the image-side surface of the fourth lens element is R8, a central thickness of the fifth lens element is CT5, a central thickness of the fourth lens element is CT4, a focal length of the fourth lens element is f4, an axial distance between the second lens element and the third lens element is T23, a central thickness of the third lens element is CT3, and the following conditions are satisfied:

$0 < f/R8 < 2.0;$ $1.3 < CT5/CT4 < 3.5;$ $-0.7 < f/f4 \leq 0.15;$ and $0.2 < CT3/T23 \leq 1.00.$ 2. The imaging optical lens system of claim 1, wherein the second lens element has negative refractive power, an axial distance between the first lens element and the second lens element is T12, an axial distance between the fourth lens element and the fifth lens element is T45, an axial distance between the third lens element and the fourth lens element is T34, and the following condition is satisfied:

$0 < (T12+T45)/(T23+T34) < 0.40.$

3. The imaging optical lens system of claim 2, wherein the object-side surface of the fifth lens element is convex in a paraxial region thereof.

4. The imaging optical lens system of claim 2, wherein the first lens element has an image-side surface being concave in a paraxial region thereof.

5. The imaging optical lens system of claim 2, wherein the fourth lens element has an object-side surface being concave in a paraxial region thereof.

6. The imaging optical lens system of claim 2, wherein an axial distance between the object-side surface of the first lens element and the image-side surface of the fifth lens element is TD, a vertical distance between a maximum effective radius position on the image-side surface of the fifth lens element and an optical axis is SD52, and the following condition is satisfied:

0.50<TD/(2*SD52)<0.80.

7. The imaging optical lens system of claim 2, wherein an axial distance between the object-side surface of the first lens element and the image plane is TL, a maximum image height of the imaging optical lens system is ImgH, and the following condition is satisfied:

TL/ImgH<1.7.

8. The imaging optical lens system of claim 1, wherein a curvature radius of the image-side surface of the fifth lens element is R10, a curvature radius of the image-side surface of the third lens element is R6, and the following condition is satisfied:

0<R10/R6<1.0.

9. The imaging optical lens system of claim 8, wherein an axial distance between the first lens element and the second lens element is T12, an axial distance between the fourth lens element and the fifth lens element is T45, an axial distance between the second lens element and the third lens element is T23, an axial distance between the third lens element and the fourth lens element is T34, and the following condition is satisfied:

0<(T12+T45)/(T23+T34)<0.40.

10. The imaging optical lens system of claim 1, wherein an Abbe number of the second lens element is V2, an Abbe number of the fourth lens element is V4, and the following condition is satisfied:

0.8<V2/V4<1.3.

11. The imaging optical lens system of claim 1, wherein the central thickness of the fifth lens element is CT5, the central thickness of the fourth lens element is CT4, and the following condition is satisfied:

1.5<CT5/CT4<3.0.

12. The imaging optical lens system of claim 3, wherein the focal length of the imaging optical lens system is f, a focal length of the third lens element is f3, a focal length of the fifth lens element is f5, and the following condition is satisfied:

0<|f/f3|+|f/f5|<0.5.

13. An imaging device, comprising:
the imaging optical lens system of claim 1; and
an image sensor.

14. A mobile terminal, comprising:
the imaging device of claim 13.

15. An imaging optical lens system comprising, in order from an object side to an image side:
a first lens element with positive refractive power having an object-side surface being convex in a paraxial region thereof;
a second lens element having refractive power;
a third lens element with positive refractive power having an object-side surface being convex in a paraxial region thereof and an image-side surface being concave in a paraxial region thereof;
a fourth lens element with refractive power having an image-side surface being concave in a paraxial region thereof, wherein both of an object-side surface and the image-side surface of the fourth lens element are aspheric, and at least one of the object-side surface and the image-side surface of the fourth lens element has at least one inflection point; and
a fifth lens element with refractive power having an object-side surface being convex in a paraxial region thereof and an image-side surface being concave in a paraxial region thereof, wherein both of the object-side surface and the image-side surface of the fifth lens element are aspheric, and at least one of the object-side surface and the image-side surface of the fifth lens element has at least one inflection point;
wherein the imaging optical lens system has a total of five lens elements with refractive power, a focal length of the imaging optical lens system is f, a curvature radius of the image-side surface of the fourth lens element is R8, a focal length of the second lens element is f2, a focal length of the fourth lens element is f4, a focal length of the fifth lens element is f5, and the following conditions are satisfied:

0.14≤f/R8≤0.85;

|f/f2|<0.8; and

−3<f4/f5<1.

16. The imaging optical lens system of claim 15, wherein the second lens element has negative refractive power.

17. The imaging optical lens system of claim 16, wherein an Abbe number of the second lens element is V2, an Abbe number of the fourth lens element is V4, and the following condition is satisfied:

0.8<V2/V4<1.3.

18. The imaging optical lens system of claim 15, wherein the focal length of the imaging optical lens system is f, the focal length of the fourth lens element is f4, and the following condition is satisfied:

−0.6<f/f4<0.

19. The imaging optical lens system of claim 15, wherein the focal length of the imaging optical lens system is f, a focal length of the third lens element is f3, the focal length of the fifth lens element is f5, and the following condition is satisfied:

0<|f/f3|+|f/f5|<0.5.

20. The imaging optical lens system of claim 15, wherein an axial distance between the first lens element and the second lens element is T12, an axial distance between the fourth lens element and the fifth lens element is T45, an axial distance between the second lens element and the third lens element is T23, an axial distance between the third lens element and the fourth lens element is T34, and the following condition is satisfied:

0<(T12+T45)/(T23+T34)<0.40.

21. The imaging optical lens system of claim 15, wherein the object-side surface of the fifth lens element is convex in a paraxial region thereof and changes to a concave shape and then a convex shape from the paraxial region to a peripheral region.

22. The imaging optical lens system of claim 15, wherein a curvature radius of the image-side surface of the fifth lens element is R10, a curvature radius of the image-side surface of the third lens element is R6, and the following condition is satisfied:

0<R10/R6<0.5.

23. An imaging device, comprising:
the imaging optical lens system of claim 15; and
an image sensor.

24. A mobile terminal, comprising:
the imaging device of claim 23.

25. An imaging optical lens system comprising, in order from an object side to an image side:
a first lens element with positive refractive power having an object-side surface being convex in a paraxial region thereof;
a second lens element having refractive power;
a third lens element with positive refractive power having an object-side surface being convex in a paraxial region thereof and an image-side surface being concave in a paraxial region thereof;
a fourth lens element with refractive power having an object-side surface being convex in a paraxial region thereof and an image-side surface being concave in a paraxial region thereof, wherein both of an object-side surface and the image-side surface of the fourth lens element are aspheric, and at least one of the object-side surface and the image-side surface of the fourth lens element has at least one inflection point; and
a fifth lens element with refractive power having an object-side surface being convex in a paraxial region thereof and an image-side surface being concave in a paraxial region thereof, wherein both of the object-side surface and the image-side surface of the fifth lens element are aspheric, and at least one of the object-side surface and the image-side surface of the fifth lens element has at least one inflection point;
wherein the imaging optical lens system has a total of five lens elements with refractive power, a focal length of the imaging optical lens system is f, a curvature radius of the image-side surface of the fourth lens element is R8, a focal length of the second lens element is f2, a focal length of the fourth lens element is f4, a focal length of the fifth lens element is f5, and the following conditions are satisfied:

$0 < f/R8 \leq 0.85$;

$|f/f2| < 0.8$; and $-3 < f4/f5 < 1$.

26. The imaging optical lens system of claim 25, wherein the second lens element has negative refractive power.

27. The imaging optical lens system of claim 26, wherein an Abbe number of the second lens element is V2, an Abbe number of the fourth lens element is V4, and the following condition is satisfied:

$0.8 < V2/V4 < 1.3$.

28. The imaging optical lens system of claim 25, wherein the focal length of the imaging optical lens system is f, the focal length of the fourth lens element is f4, and the following condition is satisfied:

$-0.6 < f/f4 < 0$.

29. The imaging optical lens system of claim 25, wherein the focal length of the imaging optical lens system is f, a focal length of the third lens element is f3, the focal length of the fifth lens element is f5, and the following condition is satisfied:

$0 < |f/f3| + |f/f5| < 0.5$.

30. The imaging optical lens system of claim 25, wherein an axial distance between the first lens element and the second lens element is T12, an axial distance between the fourth lens element and the fifth lens element is T45, an axial distance between the second lens element and the third lens element is T23, an axial distance between the third lens element and the fourth lens element is T34, and the following condition is satisfied:

$0 < (T12+T45)/(T23+T34) < 0.40$.

31. The imaging optical lens system of claim 25, wherein the object-side surface of the fifth lens element is convex in a paraxial region thereof, changes to a concave shape from the paraxial region to a peripheral region, and a convex shape in the peripheral region.

32. The imaging optical lens system of claim 25, wherein a curvature radius of the image-side surface of the fifth lens element is R10, a curvature radius of the image-side surface of the third lens element is R6, and the following condition is satisfied:

$0 < R10/R6 < 0.5$.

33. An imaging device, comprising:
the imaging optical lens system of claim 25; and
an image sensor.

34. A mobile terminal, comprising:
the imaging device of claim 33.

* * * * *